United States Patent
Takahashi

(10) Patent No.: US 6,493,302 B2
(45) Date of Patent: Dec. 10, 2002

(54) INFORMATION RECORDING APPARATUS AND METHOD WITH REPLACEMENT PROCESS

(75) Inventor: Hideki Takahashi, Kashiwa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/076,283

(22) Filed: Feb. 19, 2002

(65) Prior Publication Data

US 2002/0078417 A1 Jun. 20, 2002

Related U.S. Application Data

(62) Division of application No. 09/394,090, filed on Sep. 13, 1999.

(30) Foreign Application Priority Data

Sep. 14, 1998 (JP) ............................................. 10-260274

(51) Int. Cl.$^7$ ................................................. G11B 7/00
(52) U.S. Cl. ............................. 369/53.15; 369/275.3; 369/53.17
(58) Field of Search ........................... 369/47.15, 47.17, 369/53.15, 53.17, 53.36, 275.3

(56) References Cited

U.S. PATENT DOCUMENTS 5,805,547 A * 9/1998 Yamamura ............... 369/53.15

FOREIGN PATENT DOCUMENTS

| JP | 62-188067 | 8/1987 |
|----|-----------|--------|
| JP | 2-189767 | 7/1990 |
| WO | WO 98/14938 | 4/1998 |

* cited by examiner

Primary Examiner—Nabil Hindi
(74) Attorney, Agent, or Firm—Oblon, Spivak, McClelland, Maier & Neustadt, P.C.

(57) ABSTRACT

Address data recorded in each header field assured in a sector field is played back. It is checked based on the playback result of the address data if the sector field that records the playback sector data is defective. It is checked based on the defect discrimination results for 16 sector fields included in one block if the block is defective. Upon recording $k_1$ block data on an optical disk, $k_2$ blocks more than $k_1$ blocks actually required for recording $k_1$ ECC block data are assigned as a recording area of the $k_1$ ECC block data. When 16 sector data are recorded in 16 sector fields included in one block to have one-to-one correspondence with each other, the 16 sector data are replaced and recorded in 16 sector fields included in a normal block, which is not determined to be defective, while skipping a defective block which is determined to be defective.

10 Claims, 18 Drawing Sheets

FIG. 5

| b31 | b30 b29 | b24 b23 | b0 |
|---|---|---|---|
| | ENTRY TYPE | RESERVED | PHYSICAL SECTOR NUMBER OF DEFECTIVE SECTOR |

FIG. 6

| b63 | b62 b56 | b55 b32 | b31 b24 | b23 b0 |
|---|---|---|---|---|
| FRM | RESERVED | PHYSICAL SECTOR NUMBER OF THE FIRST SECTOR IN THE DEFECTIVE BLOCK | RESERVED | PHYSICAL SECTOR NUMBER OF THE FIRST SECTOR IN THE REPLACEMENT BLOCK |

INFORMATION RECORDING APPARATUS AND METHOD WITH REPLACEMENT PROCESS

This application is a divisional of Ser. No. 09/394,090 filed Sep. 13, 1999.

BACKGROUND OF THE INVENTION

The present invention relates to an information recording apparatus and method that execute information recording with a replacement process with respect to a rewritable information recording medium characterized by high-density recording.

As an information recording medium characterized by high-density recording, a DVD (Digital Video Disk) is known. In recent years, the DVD has been extensively studied and developed. The DVD is roughly classified into a read-only DVD-ROM and a rewritable DVD-RAM. In the DVD-RAM, a wobbled track is recorded, and sector fields are formed in units of predetermined track lengths. Each sector field is handled as a minimum unit of data recording. The sector field contains address data indicating the absolute position on a disk, and data is recorded/played back with by the help of this address data.

However, the sector fields may include defective ones from which the address data cannot be normally played back due to the influences of scratches or dust on the disk. In such case, data is recorded/played back by the help of wobbles (by counting wobbles).

However, normal data recording/playback often fails if it is done by the help of only wobbles. When data recording/playback is continued by the help of only wobbles which have slight changes, data recording/playback precision suffers considerable drop. In addition, data recording/playback precision drop is also accounted for by miscounting of wobbles due to defective wobbles. Also, when tracking errors has occurred, wobbles can no longer help.

BRIEF SUMMARY OF THE INVENTION

The present invention has been made to solve the above problems, and has as its object to provide a data recording apparatus and method with a replacement process, which can prevent any data recording/playback precision drop.

(1) A data recording apparatus with a replacement process according to the present invention, comprises:
  playback means for accessing an optical disk to play back address data recorded in header fields assured in each sector field;
  first discrimination means for discriminating based on a playback result of the address data by the playback means if the sector field which records the address data is defective;
  second discrimination means for discriminating based on discrimination results of the first discrimination means with respect to a predetermined number of sector fields included in one block if the block is defective;
  assignment means for assigning $k_2$ blocks larger than $k_1$ blocks ($k_1 < k_2$) substantially required for recording $k_1$ ECC block data as a recording area of the $k_1$ ECC block data upon recording the $k_1$ ECC block data on the optical disk; and
  recording means for replacing and recording a predetermined number of sector data in a predetermined number of sector fields included in a normal block, which is not determined by the second discrimination means to be defective, to have one-to-one correspondence with each other, while skipping a defective block which is determined by the second discrimination means to be defective, upon recording a predetermined number of sector data in a predetermined number of sector fields included in the block to have one-to-one correspondence with each other.

(2) A data recording method with a replacement process according to the present invention, comprises:
  the first step of accessing an optical disk to play back address data recorded in header fields assured in each sector field;
  the second step of discriminating based on a playback result of the address data in the first step if the sector field which records the address data is defective;
  the third step of discriminating based on discrimination results in the second step with respect to a predetermined number of sector fields included in one block if the block is defective;
  the fourth step of assigning $k_2$ blocks larger than $k_1$ blocks ($k_1 < k_2$) substantially required for recording $k_1$ ECC block data as a recording area of the $k_1$ ECC block data upon recording the $k_1$ ECC block data on the optical disk; and
  the fifth step of replacing and recording a predetermined number of sector data in a predetermined number of sector fields included in a normal block, which is not determined in the third step to be defective, to have one-to-one correspondence with each other, while skipping a defective block which is determined in the third step to be defective, upon recording a predetermined number of sector data in a predetermined number of sector fields included in the block to have one-to-one correspondence with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a view showing the data structure of a PDL (Primary Defect List);

FIG. 6 is a view showing the data structure of an SDL (Secondary Defect List);

DETAILED DESCRIPTION OF THE INVENTION

The preferred embodiment of the present invention will be described hereinafter with reference to the accompanying drawings.

An outline of an optical disk (DVD-RAM disk) as an information recording medium will be briefly explained below with reference to FIG. 1.

Figure 1:
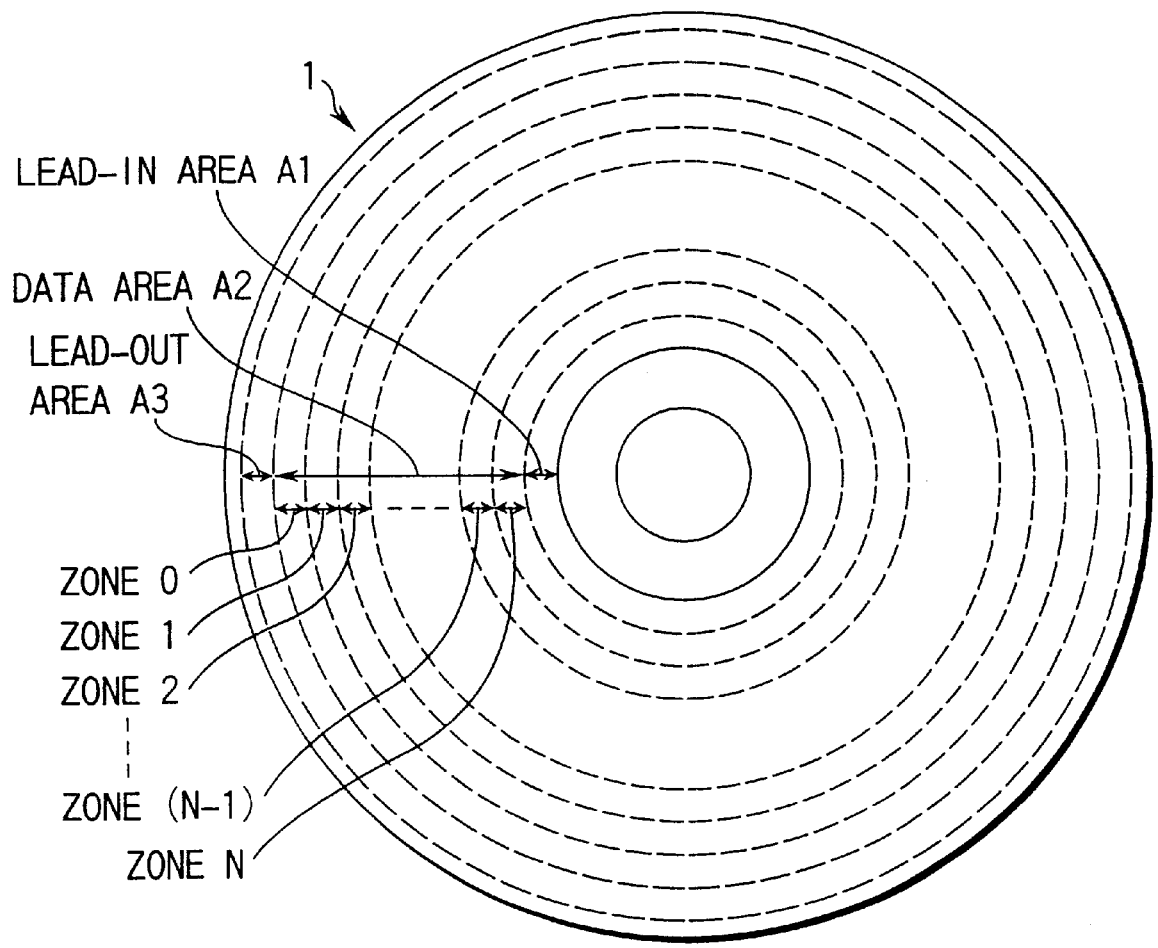
FIG. 1 is a view showing the layout of zones formed on an optical disk.

FIG. 1 shows the layout of a lead-in area, data area, lead-out area, and the like on an optical disk.

As shown in FIG. 1, a lead-in area A1, data area A2, and lead-out area A3 are assured on an optical disk 1 in turn from the inner periphery side. The lead-in area A1 includes an emboss data zone, mirror zone (non-recording zone), and rewritable data zone. The data area A2 includes a rewritable data zone, which includes a plurality of zones 0 to N. The lead-out area A3 includes a rewritable data zone.

On the emboss data zone in the lead-in area A1, a reference signal and control data are recorded as a embossed pattern upon manufacturing the optical disk 1. On the rewritable data zone in the lead-in area A1, identification data for identifying the type of disk, defect management data for managing defective areas, and the like are recorded. Note that an area where the defect management data is recorded will be referred to as a DMA (Defect Management Area) hereinafter. On the rewritable data zone in the lead-out area A3, the same data as those recorded on the rewritable data zone in the lead-in area A1 are recorded.

The emboss data zone in the lead-in area A1 consists of a plurality of tracks, each of which consists of a plurality of sector fields. This zone is processed at a predetermined rotational speed.

Each of the rewritable data zone in the lead-in area A1 and zone 0 of the rewritable data zone in the data area A2 consists of X tracks, each of which consists of Y sector fields. This zone is processed at a rotational speed Z0 (Hz).

Zone 1 of the rewritable data zone in the data area A2 consists of X tracks, each of which consists of (Y+1) sector fields. This zone is processed at a rotational speed Z1 (Hz).

Zone 2 of the rewritable data zone in the data area A2 consists of X tracks, each of which consists of (Y+2) sector fields. This zone is processed at a rotational speed Z2 (Hz) (Z1>Z2).

Each of zones 3 to N of the rewritable data zone in the data area A2 consists of X tracks. Each track in zone 3 consists of (Y+3) sector fields, and each track in zone 4 consists of (Y+4) sector fields. That is, each track in zone N consists of (Y+N) sector fields. Zone 3 is processed at a rotational speed Z3 (Hz) (Z2>Z3), and zone 4 is processed at a rotational speed Z4 (Hz) (Z3>Z4). That is, zone N is processed at a rotational speed ZN (Hz) (Z(N−1)>ZN).

The rewritable data zone in the lead-out area A3 consists of a plurality of tracks, each of which consists of (Y+N) sector fields. This zone is processed at a rotational speed ZN (Hz).

As described above, the number of sector fields per track increases and the rotational speed lowers in turn from the zones on the inner periphery side of the optical disk 1. That is, the optical disk 1 is compatible with the ZCLV (Zone Constant Linear Velocity) scheme.

Subsequently, the format of a sector field on the DVD-RAM disk will be explained below with reference to FIG. 2.

Figure 2:
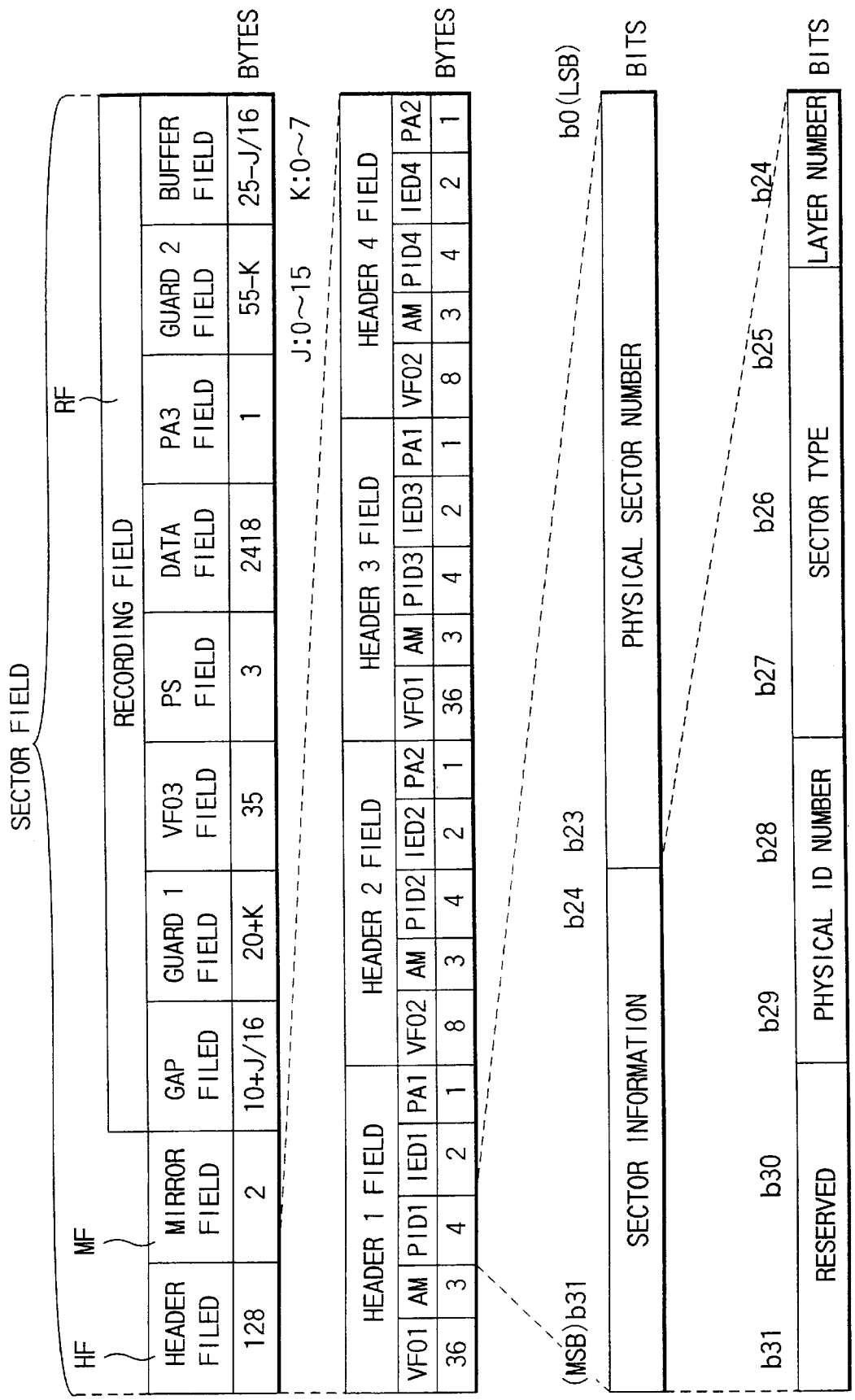
FIG. 2 is a view showing the data structure of a sector field formed on the optical disk.

As shown in FIG. 2, one sector field consists of nearly 2,697 bytes. This sector field records data modulates by 8-16 modulation. 8-16 modulation modulates an 8-bit input code sequence into a 16-bit output code sequence. The input code sequence is called input bits, and the output code sequence channel bits. Note that 1 byte means 16 channel bits.

The contents of one sector field will be explained below. One sector field is constructed by a 128-byte header field HF, 2-byte mirror field MF, and 2,567-byte recording field RF.

The header field HF records header data as an embossed pattern in the manufacturing process of the optical disk. In this header field HF, header data is written four times to improve detection precision of header data. That is, this header field HF contains a header 1 field, header 2 field, header 3 field, and header 4 field. Each of the header 1 field and header 3 field consists of 46 bytes. Each of the header 2 field and header 4 field consists of 18 bytes.

The header 1 field contains 36-byte VFO (Variable Frequency Oscillator) 1, 3-byte AM (Address Mark), 4-byte PID (Physical ID) 1, 2-byte IED (ID Error Detection Code) 1, and 1-byte PA (Post Ambles) 1.

The header 2 field contains 8-byte VFO2, 3-byte AM, 4-byte PID2, 2-byte IED2, and 1-byte PA2.

The header 3 field contains 36-byte VFO1, 3-byte AM, 4-byte PID3, 2-byte IED3, and 1-byte PA1.

The header 4 field contains 8-byte VFO2, 3-byte AM, 4-byte PID4, 2-byte IED4, and 1-byte PA2.

Each of the PID1, PID2, PID3, and PID4 contains sector information and a physical sector number (physical address). Each of the VFO1 and VFO2 contains a continuous repetitive pattern (100010001000 . . . ) for a PLL (Phase Locked Loop) process. The AM contains a special mark (address mark) which violates a constraint length for indicating the PID position. Each of the IED1, IED2, IED3, and IED4 contains an error detection code for detecting a PID error. The PA contains state information required for demodulation, and also has a role of polarity adjustment to terminate the header field HF with a space. The mirror field MF stores mirror data.

The recording field RF records user data. The recording field contains a (10+J/16)-byte gap field, (20+K(-byte guard 1 field, 35-byte VFO3 field, 3-byte PS (pre-synchronous code) field, 2,418-byte data field (user data field), 1-byte post amble PA3 field, (55-K)-byte guard 2 field, and (25-J/16)-byte buffer field. Note that J assumes a random integer ranging from 0 to 15, and K assumes a random integer ranging from 0 to 7. In this manner, the data write start position is randomly shifted. As a result, deterioration of a recording film due to overwrite can be minimized.

The gap field records no data. The guide 1 field is a sacrificed area for absorbing leading edge deterioration caused by repetitive overwrite processes, which is unique to a phase-change recording film. The VFO3 field is a PLL lock field, and also has a roll of synchronizing byte boundaries by inserting a synchronous code in identical patterns. The PS code records a synchronous code.

The data field records a data ID, IED (Data ID Error Detection Code), synchronous code, ECC (Error Correction Code), EDC (Error Detection Code), 2,048-byte user data, and the like. The data ID contains a logical sector number (logical address). The IED is a 2-byte (16-bit) error correction code for the data ID.

The PA3 field contains state information required for demodulation, and indicates the end of the last byte in the previous data field. The guard 2 field prevents trailing edge deterioration upon repetitive recording, which is also unique to a phase-change recording medium, from influencing the data field. The buffer field absorbs variations of rotation of a motor for rotating the optical disk 1 and the like to prevent the data field from overlapping the next header field.

The PID1, PID2, PID3, and PID4 will be explained in detail below. Each of these PIDs contains 8-bit sector information, and a 24-bit physical sector number. The physical sector number records address data indicating the absolute position of the sector field. The sector information contains information such as a 2-bit reserved area, 2-bit physical ID number, 3-bit sector type, 1-bit layer number, and the like. The reserved area is a non-recording area.

The physical ID numbers in the header 1, 2, 3, and 4 fields record "00", "01", "10", and "11" indicating the PID1, PID2, PID3, and PID4, respectively.

The sector type records "000" or "011" indicating a reserved sector; "100" indicating a rewritable first sector in a track; "101" indicating a rewritable last sector in a track; "110" indicating a rewritable last but one sector in a track; or "111" indicating a rewritable other sector in a track.

The layer number records "0" indicating layer 0, or "1" indicating "reserved".

Figure 3:
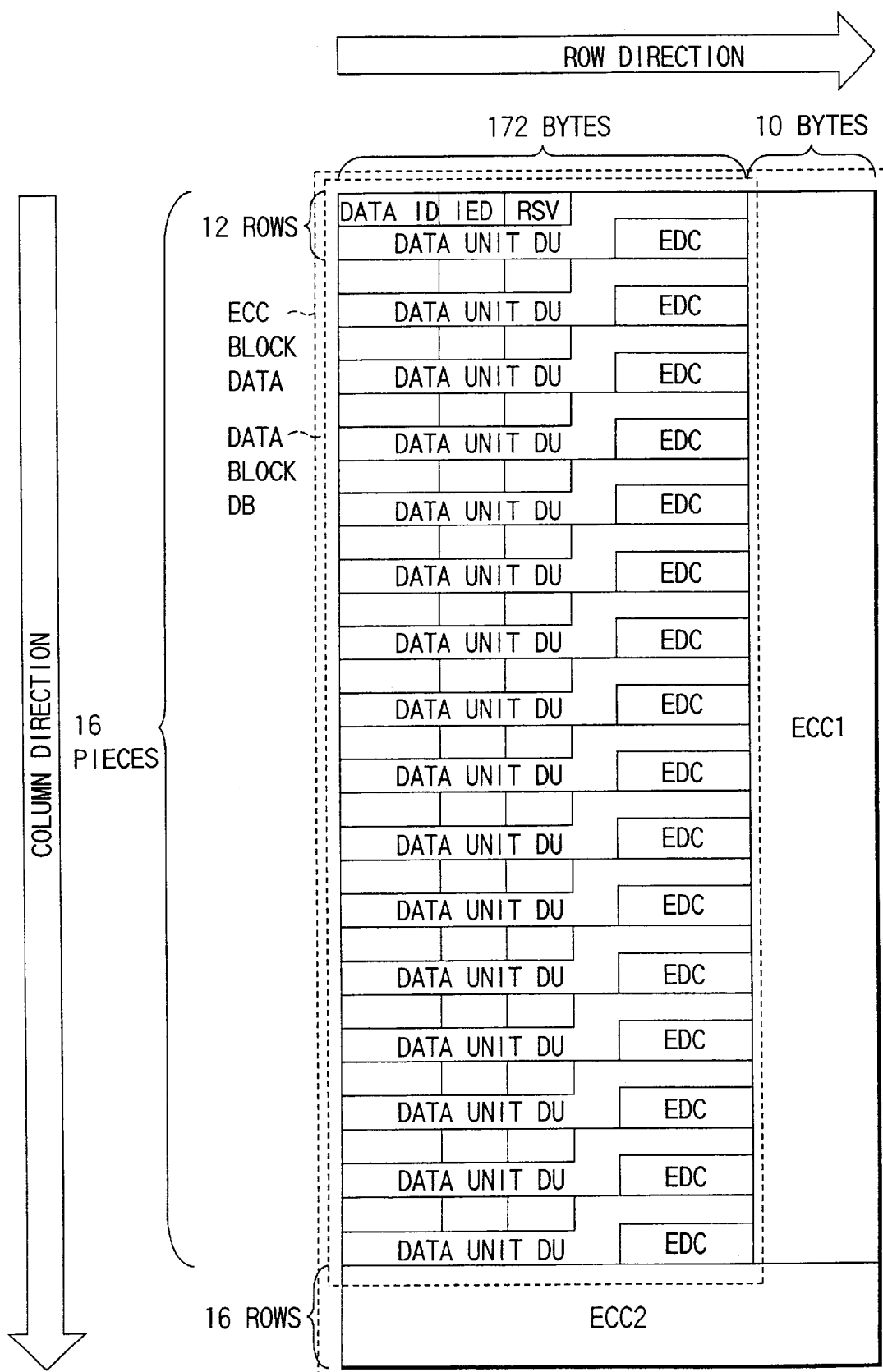
FIG. 3 is a view showing the data structure of ECC block data.
Figure 4:
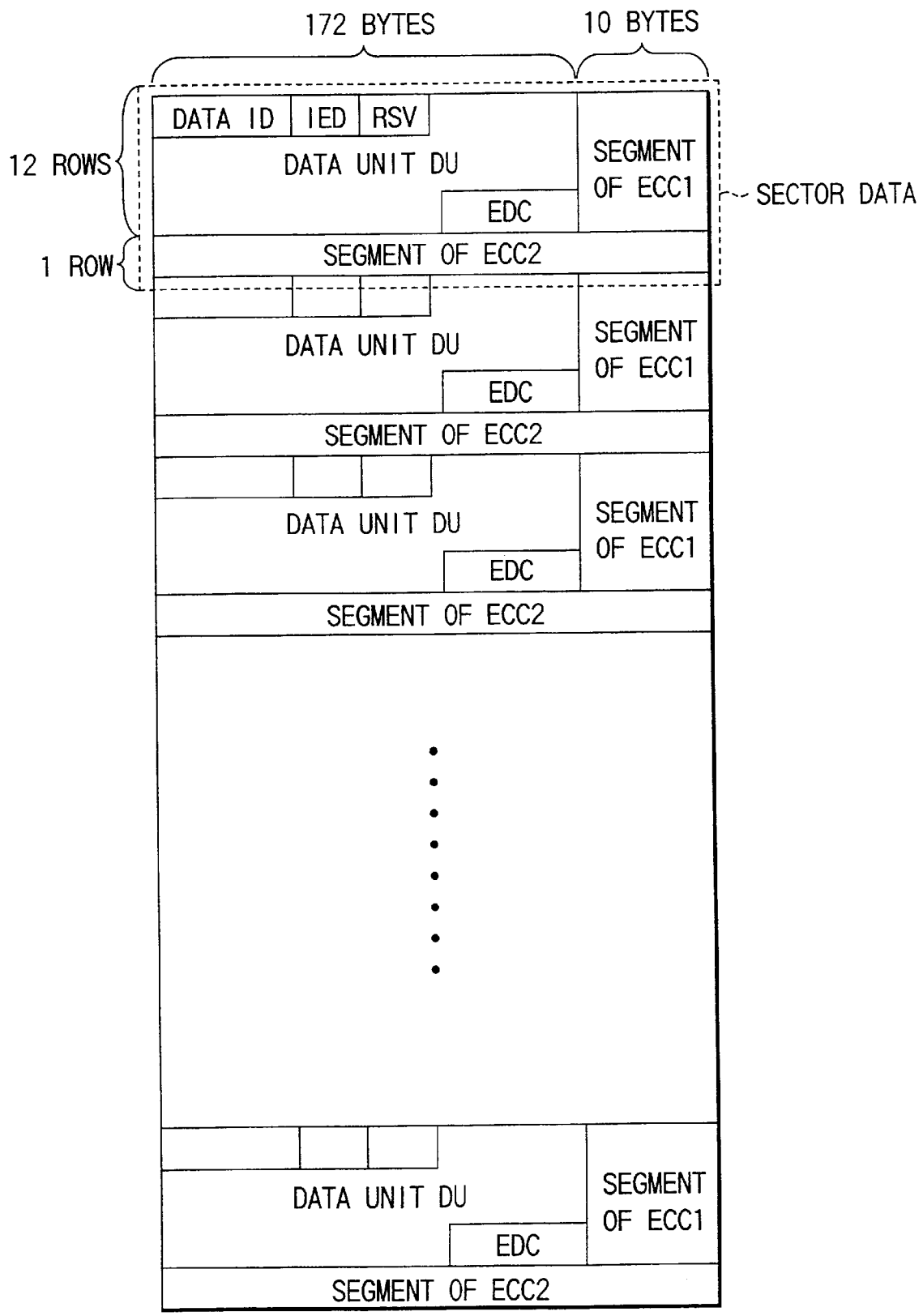
FIG. 4 is a view showing the data structure of sector data generated based on the ECC block data shown in FIG. 3.

The data structures of the ECC block data and sector data will be explained below with reference to FIGS. 3 and 4. FIG. 3 shows the data structure of the ECC block data. FIG. 4 shows the data structure of the sector data recorded in the data field shown in FIG. 2.

Tracks are formed on a DVD-RAM, and a plurality of sector fields are formed in each track. In other words, a plurality of successive sector fields form a track. The DVD-RAM records data in a format called ECC block data. Strictly speaking, 16 sector data generated based on the ECC block data are distributed and recorded in 16 sector fields. In addition, a group of sector data is recorded in the 2,418-byte data field shown in FIG. 2.

As shown in FIG. 3, the ECC block data consists of a data block DB (user data, and the like), ECC1, and ECC2.

The data block DB is constructed by an array of data which has a predetermined number of rows and columns, and can be segmented into 16 data units. More specifically, the data block DB is constructed by 172 (bytes)×12 (the number of rows forming each data unit)×16 (the number of data units forming the data block) data. Each data unit DU is constructed by 172 (bytes)×12 (the number of rows forming each data unit) data. Each data unit DU contains a data ID, IED, EDC, 2,048-byte user data, and the like. The data ID is used for scrambling user data contained in the data unit DU. The EDC is used for detecting any error contained in a set of data in the data unit.

The ECC1 is used for correcting LRC errors in the data block DB. More specifically, the ECC1 is constructed by 10 (bytes)×12 (the number of rows forming each data unit DU)×16 (the number of data units forming the data block) data. This ECC1 has error correction performance that normally corrects errors up to 5 bytes, and corrects errors up to 10 bytes upon erasure correction.

The ECC2 is used for correcting VRC errors in the data block DB. More specifically, the ECC2 is constructed by {172 (bytes)+10 (bytes)}×16 (the number of data units forming the data block) data. This ECC2 has error correction performance that normally corrects errors up to 8 bytes, and corrects errors up to 16 bytes upon erasure correction.

The sector data will be explained below with the aid of FIG. 4.

Sixteen sector data are generated from one ECC block data. One sector data consists of a data unit DU, a segment of the LRC error correction code ECC1, and a segment of the VRC error correction code ECC2, which is assigned to this data unit DU. More specifically, the sector data is composed of {172 (bytes)+10 (bytes)}×{12 (the number of rows forming each data unit DU)+1 (for one column of the VRC error correction code ECC2)} data.

Figure 12:
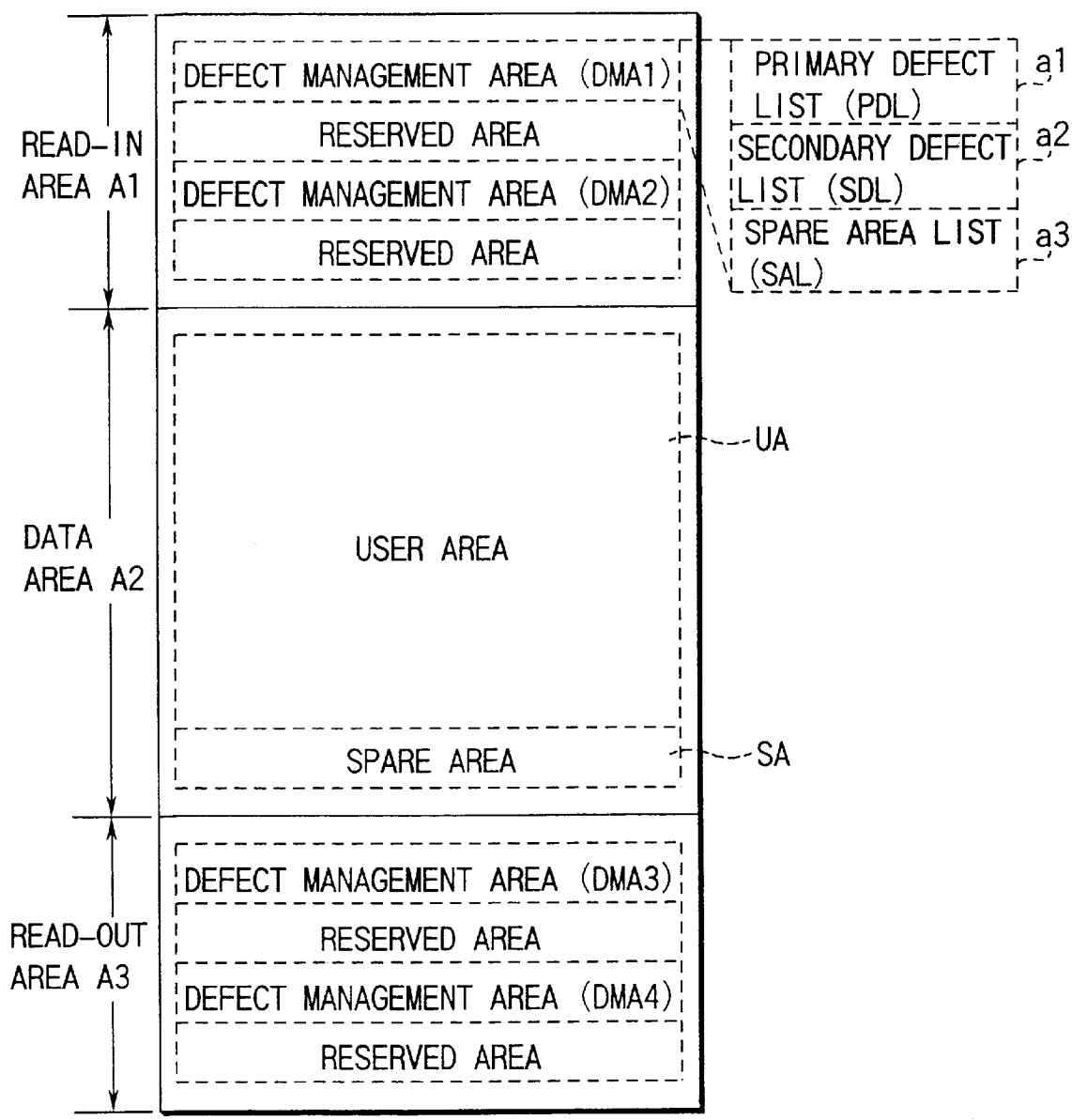
FIG. 12 is a view showing the data structure on the optical disk and, especially, the layout of a defect management area.

The data structure of the DMA will be explained below with reference to FIG. 12.

A total of four DMAs are assured on the optical disk, and record identical data. Two (DMA1 and DMA2) out of the four DMAs (DMA1 to DMA4) are assured in the lead-in area, and the two remaining DMAs (DMA3 and DMA4) in the lead-out area.

Each DMA (DMA1 to DMA4) contains a DDS (Disc Definition Structure). Each DMA (DMA1 to DMA4) is assured with areas a1, a2, and a3. The area a1 stores a PDL (Primary Defect List) as an entry. The area a2 stores an SDL (Secondary Defect List) as an entry. The area a3 stores an SAL (Spare Area List) as an entry.

In addition to the above structure, each DMA may have the following data structure. That is, each DMA (DMA1 to DMA4) contains a DDS (Disc Definition Structure). Each DMA (DMA1 to DMA4) is assured with areas a1 and a2 (assume that no area a3 is assured). The area a1 stores a PDL (Primary Defect List) as an entry. The area a2 stores an SDL (Secondary Defect List) as an entry. The DDS and SDL store an SAL as an entry.

Apart from the above, it is possible that the a data indicating the position of a spare area is registered in empty regions of DDS, PDL and SDL. In this manner, it becomes no longer necessary to set a list such as SAL.

In either structure, the SAL is stored as an entry in some area on the optical disk.

Figure 7:
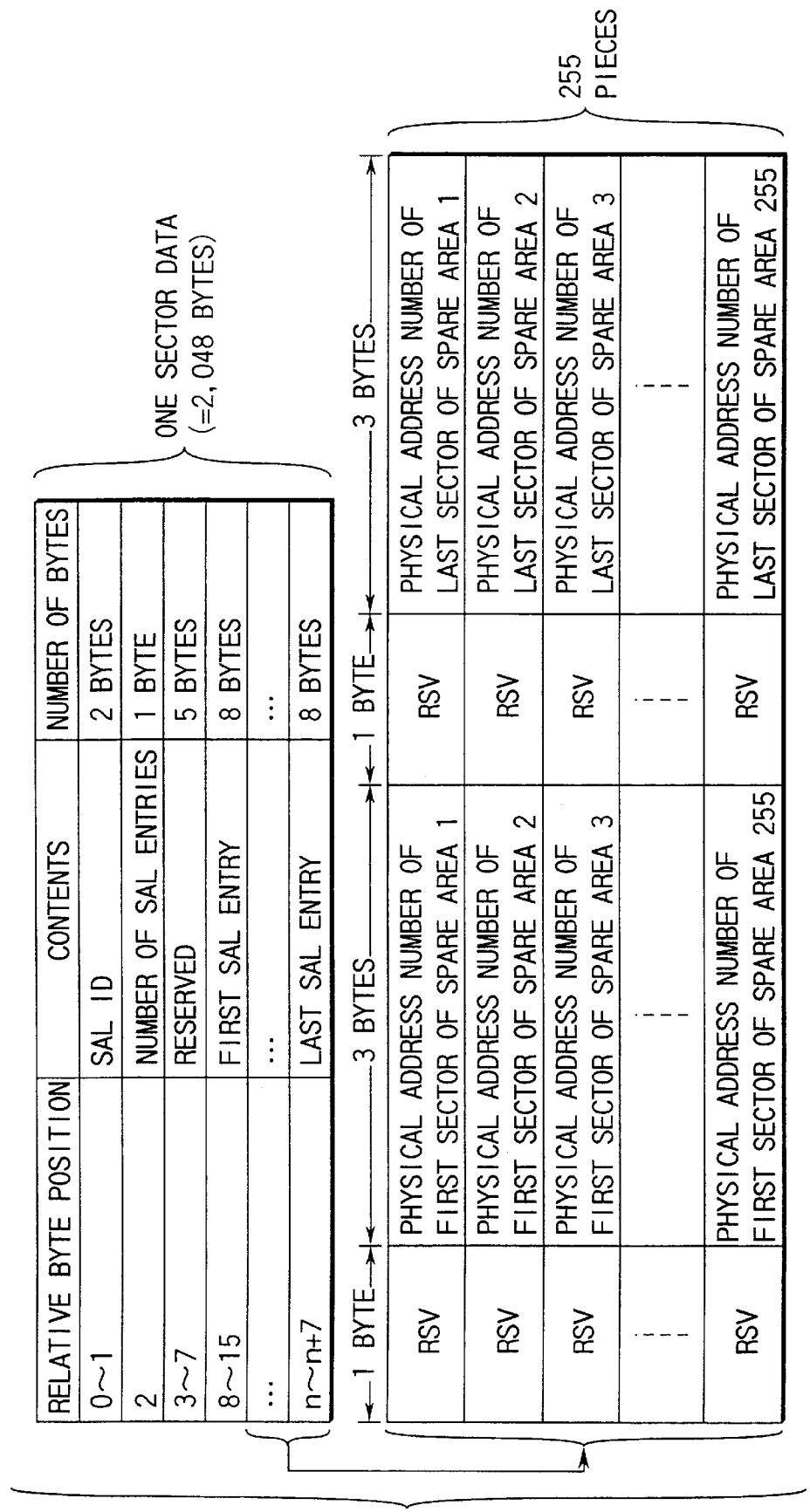
FIG. 7 is a view showing the data structure of an SAL (Spare Area List)

FIG. 5 shows the data structure of the PDL as an entry of the area a1. FIG. 6 shows the data structure of the SDL as an entry of the area a2. FIG. 7 shows the data structure of the SAL as an entry of the area a3.

As shown in FIG. 5, the PDL includes in the order from its MSB an area for recording an entry type, a reserved area, and an area for recording the physical sector number of a defective sector. The defective sector will be explained in detail later.

As shown in FIG. 6, the SDL includes in the order from its MSB an area for recording an assignment mark (FRM), a reserved area, an area for recording the physical sector number of the first sector (indicating the first one of 16 sector fields that constructs a defective block) in a defective block, reserved area, and an area for recording the physical sector number of the first sector (indicating the first one of 16 sector fields that constructs a replacement block) in a replacement block.

As shown in FIG. 7, the data SAL consisting of one sector data (=2,048 bytes) includes in turn an SAL ID (2 bytes), the number of SAL entries (1 byte), a reserved area (5 bytes), the first SAL entry (8 bytes), . . . , and the last SAL entry (8 bytes). The first SAL entry is the first entry, and the last SAL entry is the 255th entry. That is, the SAL data includes a maximum of 255 SAL entries (one sector can manage SALs at 255 positions). Each SAL includes in turn an RSV (1 byte), the physical address number (3 bytes) of the first sector of spare area n, an RSV, and the physical address number (3 bytes) of the last sector of spare area n. The physical address number of the first sector of spare area n stands for the start address indicative of the start position of spare area n. The physical address number of the last sector of spare area n stands for the end address indicative of the end position of spare area n.

A replacement process will be explained below. The replacement process includes a slipping replacement process, linear replacement process, and skipping replacement process. The slipping replacement process is done for primary defects in units of sector fields. The linear replacement process is done for secondary defects in units of blocks each consisting of a set of a predetermined number of sector fields. The skipping replacement process can be done irrespective of primary or secondary defects, and includes a sector skipping replacement process which is done in units of sector fields, and a block skipping replacement process which is done in units of blocks. These processes will be described in detail below.

The slipping replacement process will be explained first.

Before delivery of an optical disk, it is certified if the rewritable data zone on the optical disk suffers defects (primary defects). That is, it is certified if data can be normally recorded in the rewritable data zone. This certification is done in units of sector fields.

During the certification, if a defective sector (indicating a sector field including defects) is found, the physical sector number of this defective sector is recorded in the PDL. Furthermore, no logical sector number is assigned to this defective sector. More specifically, logical sector numbers are assigned to only normal sectors (indicating sector fields free from any defects) allocated before and after this defective sector by ignoring the defective sector. That is, the defective sector is considered as a non-existing sector. In this manner, user data or the like is prevented from being written in such defective sector. A series of processes mentioned above are done in the slipping replacement process. Thus, the defective sectors are slipped in this slipping replacement process.

The slipping replacement process will be described in more detail below with reference to FIG. 8.

Figure 8:
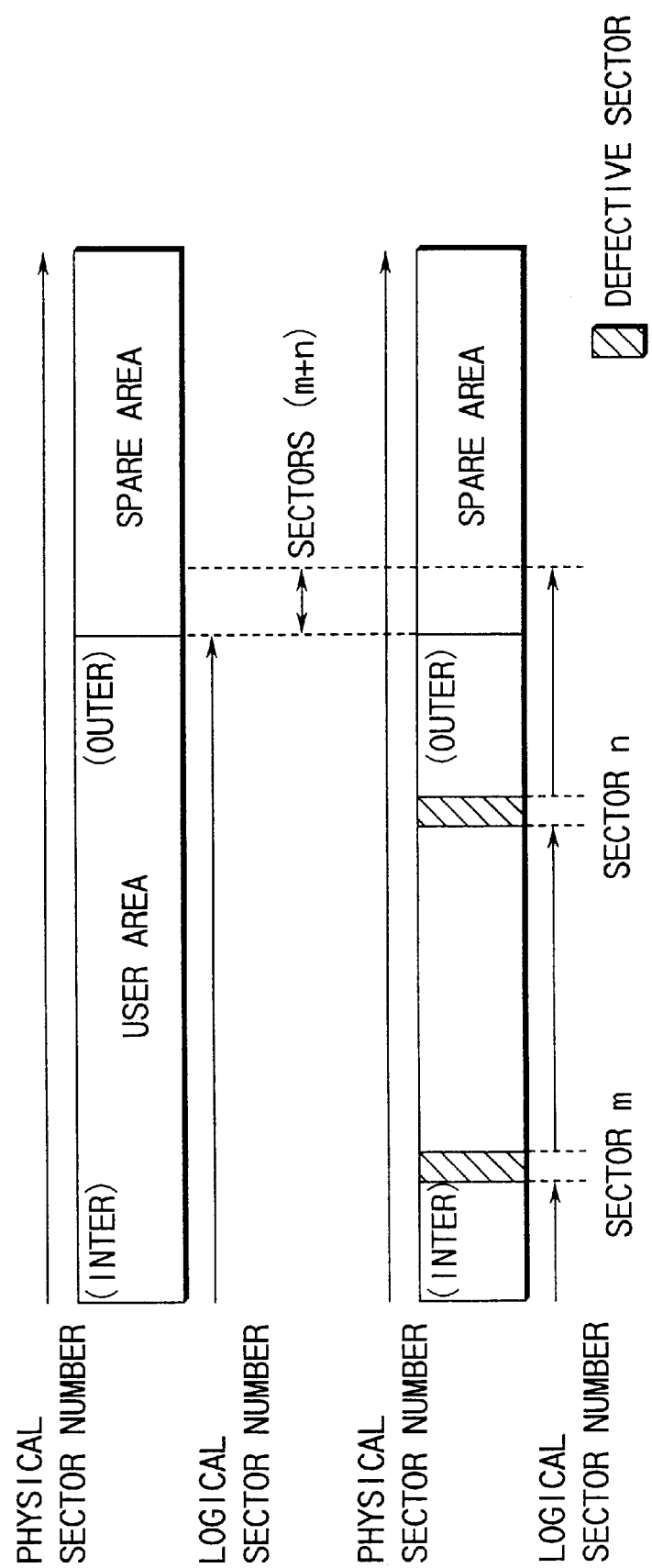
FIG. 8 is a view for explaining a slipping replacement process.

Assume that a user area (a user area UA shown in FIG. 12) and a spare area (a spare area SA shown in FIG. 12) are present, as shown in FIG. 8. Also, these user and spare areas are present in any of zones 0 to N described above with reference to FIG. 1 (an example will be explained later). Furthermore, the position of the spare area is managed by the SAL shown in FIG. 7.

For example, if defective sectors m and n are found during certification, these defective sectors are compensated for by or slipped to the spare area. That is, the defective sectors contained in those constructing the user area shown in the upper illustration in FIG. 8 are compensated for by the spare area. As described above, no logical sector numbers are assigned to defective sectors m and n. In addition, the spare area also undergoes a slipping replacement process. Hence, if any defective sector is found in the spare area, it is processed by the aforementioned skipping replacement process. Note that all the sectors have physical sector numbers irrespective of defective or normal sectors.

Second, the linear replacement process will be explained.

When user data is written after delivery of an optical disk, it is verified if the user data is normally written. A situation that user data cannot be normally written is called a secondary defect. The presence/absence of secondary defects is verified in units of 16 sector fields (i.e., in units of blocks) each of which records the ECC block data shown in FIG. 3.

If a defective block (indicating a block including secondary defects) is found, the physical sector number of the first sector in the defective block and the physical sector number of the first sector in a replacement block (indicating a block to be assured in the spare area) that is to replace the defective block are recorded in the SDL. Also, the logical sector numbers assigned to 16 sector fields in the defective block are assigned to 16 sector fields in the replacement block. In this manner, data to be recorded in the defective block is recorded in the replacement block. After that, access to the defective block is considered as that to the replacement block. A series of processes mentioned above are done in the linear replacement process. That is, in this linear replacement process, a defective block is linearly replaced.

The linear replacement process will be described in more detail below with reference to FIG. 9.

Figure 9:
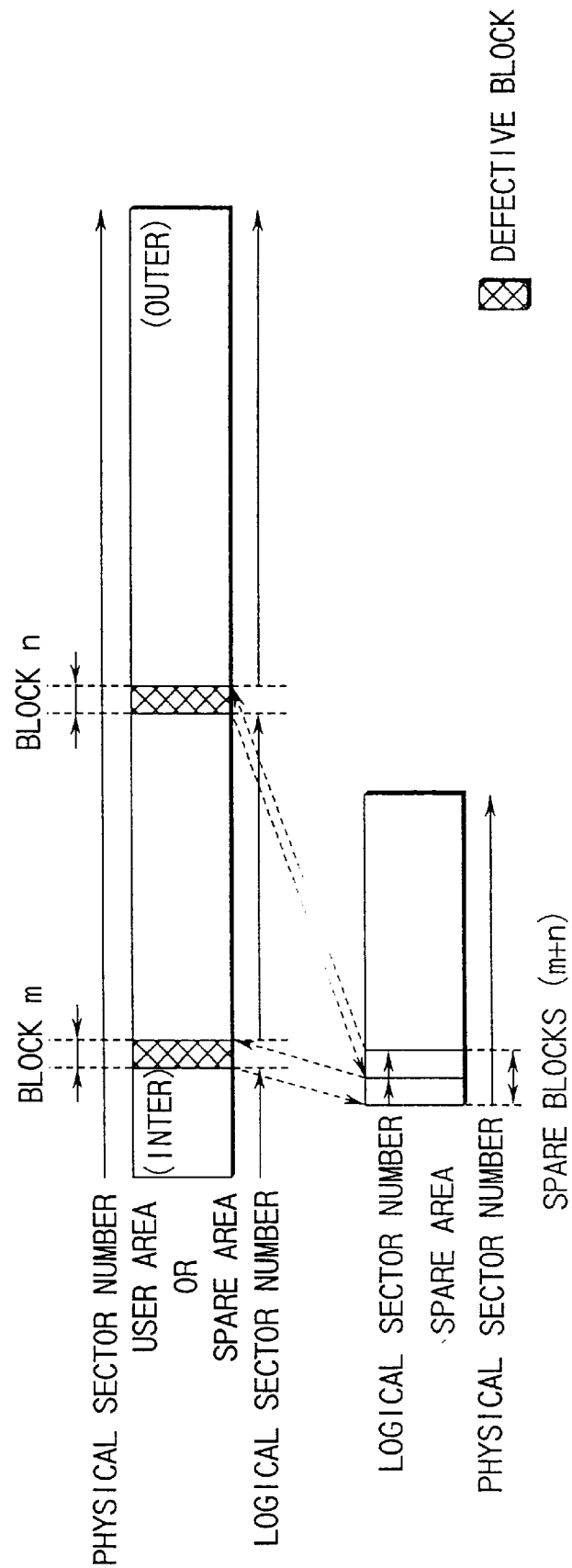
FIG. 9 is a view for explaining a linear replacement process.

Assume that a user area (a user area UA shown in FIG. 12) and a spare area (a spare area SA shown in FIG. 12) are present, as shown in FIG. 9. Also, these user and spare areas are present in any of zones 0 to N described above with reference to FIG. 1. Furthermore, the position of the spare area is managed by the SAL shown in FIG. 7.

For example, if defective blocks m and n are found upon writing user data, these two defective blocks are compensated for by a replacement block in the spare area. As described above, the logical sector numbers assigned to 16 sector fields that build defective block m are passed onto those that build replacement block m which is to replace defective block m. Likewise, the logical sector numbers assigned to 16 sector fields that build defective block n are passed onto those that build replacement block n which is to replace defective block n. In addition, the spare area also undergoes a linear replacement process. Hence, if any defective block is found in the spare area, it is processed by the aforementioned linear replacement process. Note that all sector fields that make up the block have physical sector numbers irrespective of a defective or normal block.

The block skipping replacement process will be explained third.

Figure 14:
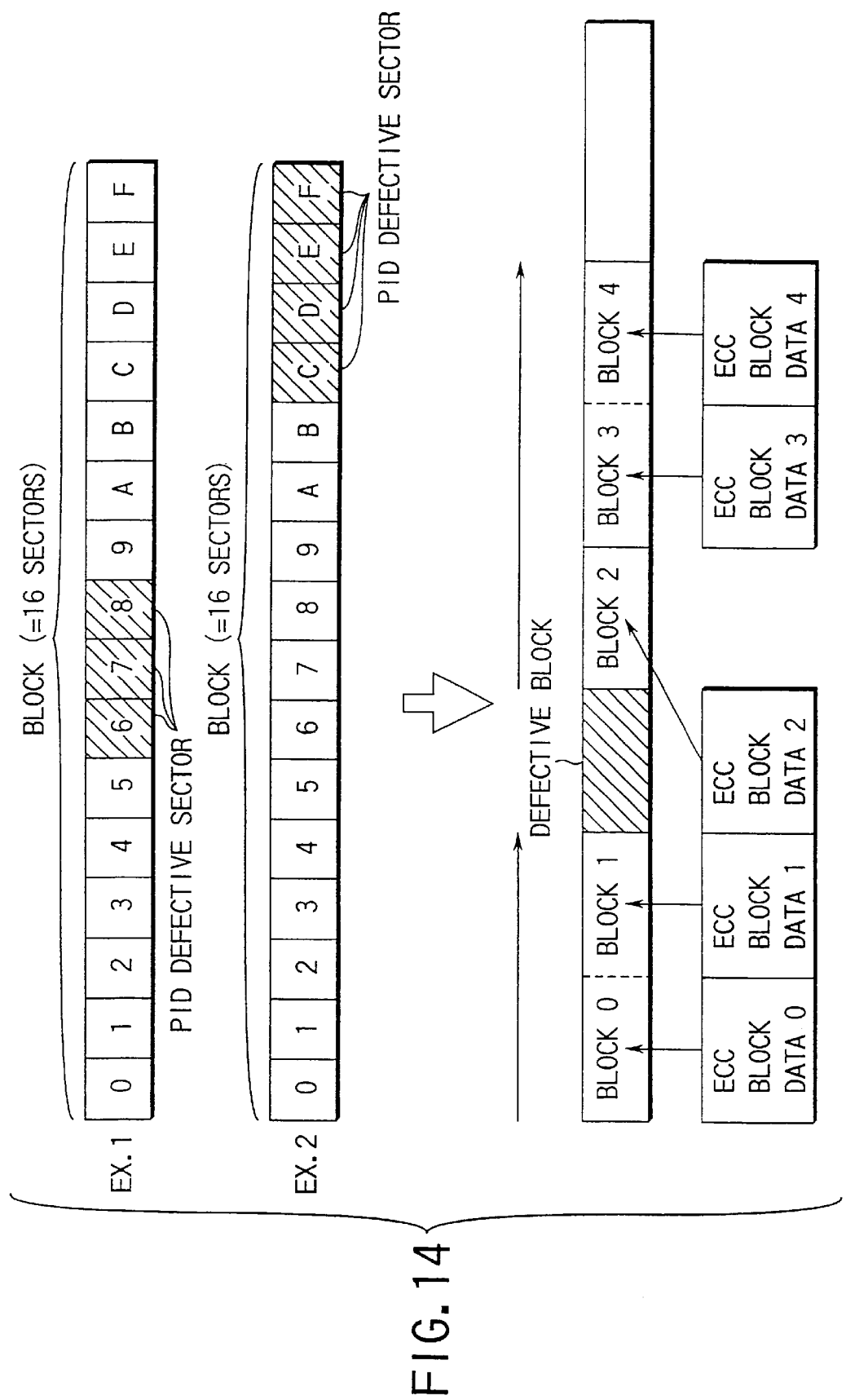
FIG. 14 is a view for explaining a block skipping replacement process.

Ex. 1 and Ex. 2 in FIG. 14 indicate sets of 16 sector fields as recording locations of the ECC block data. A set of 16 sector fields as a recording location of the ECC block data is called a block. That is, assume that 0, 1, 2, . . . , E, and F are physical sector numbers of sector fields that form the block. Ex. 1 in FIG. 14 depicts a state wherein PID errors have been detected from sector fields with physical sector numbers 6, 7, and 8. Ex. 2 in FIG. 14 depicts a state wherein PID errors have been detected from sector fields with physical sector numbers C, D, E, and F. That is, in Ex. 1 in FIG. 14, the sector fields with physical sector numbers 6, 7, and 8 correspond to PID defective sectors, and in Ex. 2 in FIG. 14, the sector fields with physical sector numbers C, D, E, and F correspond to PID defective sectors. A block which contains three or more PID defective sectors, as shown in Ex. 1 and Ex. 2 in FIG. 14, is called a defective PID block, and the PID defective block is to be replaced in the block skipping replacement process, as shown in the lowermost illustration in FIG. 14. Note that such block may be called a PID defective block not only due to the aforementioned defect factor, but also due to other defect factors.

That is, ECC block data 0 is recorded in block 0; ECC block data 1 in block 1; ECC block data 2 in block 2 by skipping the PID defective block; ECC block data 3 in block 3; and ECC block data 4 in block 4.

When any PID defective block (e.g., that shown in the lowermost illustration in FIG. 14) is found, the physical sector number of the first sector in this PID defective block and the physical sector number of the first sector in a block (e.g., block 2 shown in the lowermost illustration in FIG. 14) that replaces this PID defective block are recorded in the SDL. Also, the logical sector numbers assigned to 16 sector fields in the defective block are assigned to 16 sector fields in the replacement block. In this manner, data to be recorded in the PID defective block is recorded in the replacement block. After that, access to the defective block is considered as that to the replacement block. A series of processes mentioned above are done in the block skipping replacement process.

In the block skipping replacement process, a method of registering the absence of a block that replaces a defective block in the SDL is available in addition to the above method of registering a defective block in the SDL.

The block skipping replacement process will be described in more detail below with reference to FIG. 15. A case will be exemplified below wherein data (object data) shown in FIG. 15 is to be recorded.

Figure 13:
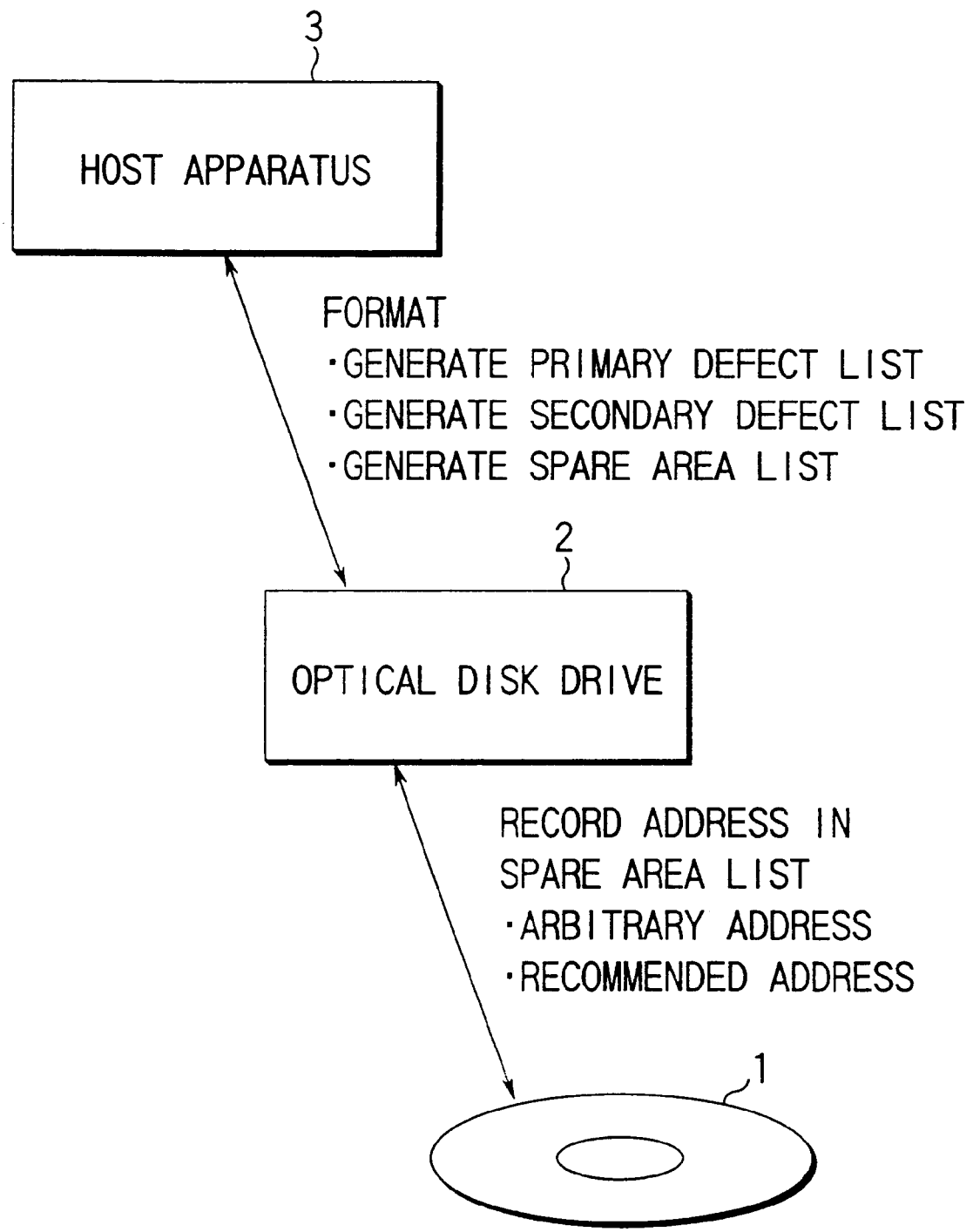
FIG. 13 is a chart for explaining processes in which an optical disk drive receives a format instruction from a host apparatus and formats the optical disk in accordance with the format instruction.
Figure 15:
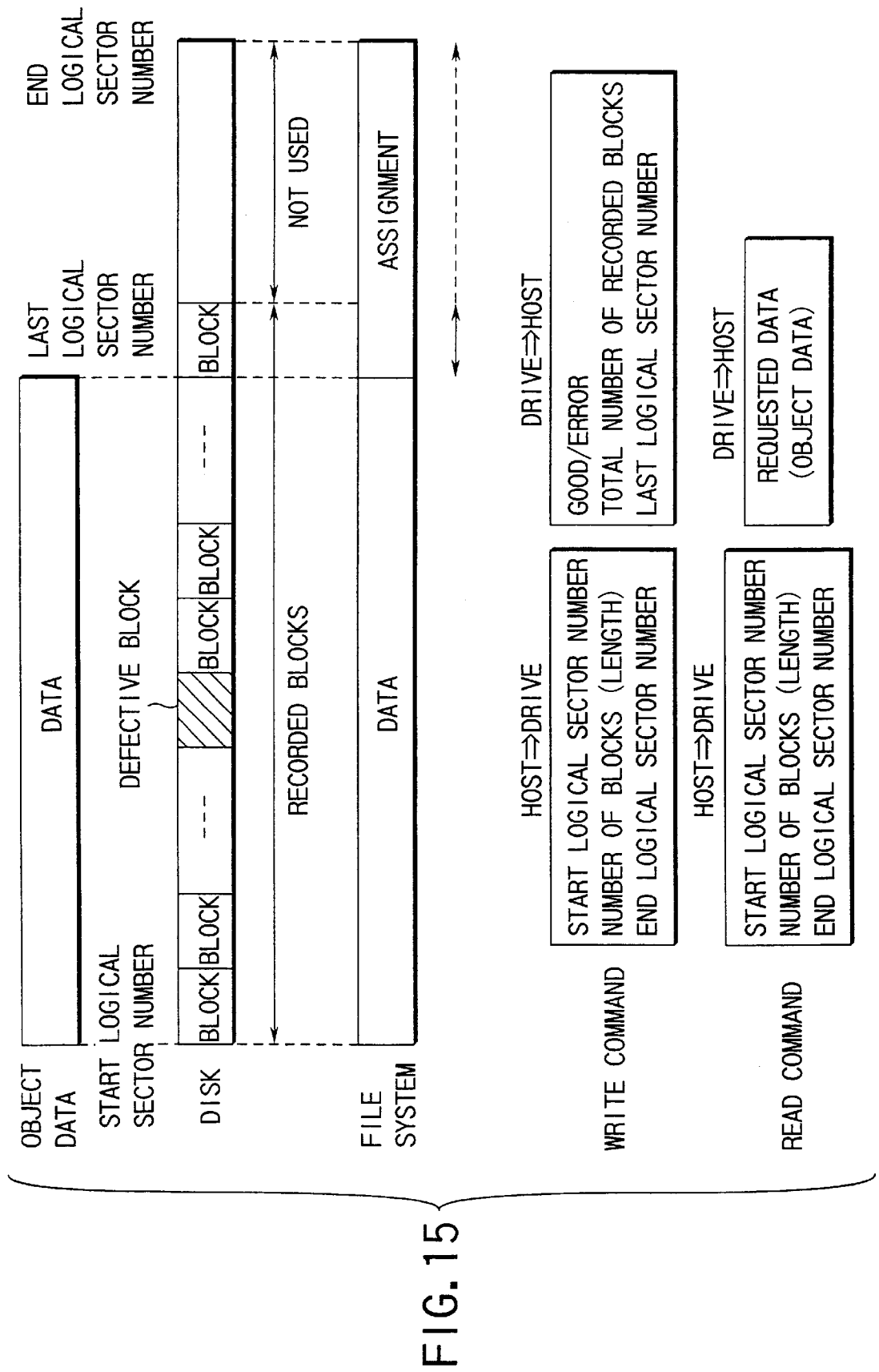
FIG. 15 is a view for explaining a block skipping replacement process as in FIG. 14.

When data (object data) shown in FIG. 15 is recorded, a host apparatus 3 (see FIG. 13) sends a write command to an optical disk drive 2 (see FIG. 13). The write command contains a start logic number sector, the number of blocks (length), and an end logic sector number. Upon receiving the write command, the optical disk drive 2 sends back a response to the host apparatus 3. The response contains good/error, the total number of recorded blocks (length), and a last logical sector number.

On the other hand, when data (object data) shown in FIG. 15 is to be played back, the host apparatus 3 sends a read command to the optical disk drive 2. The read command contains a start logic sector number, the number of blocks (length), and an end logic sector number. Upon receiving the read command, the optical disk drive 2 sends back a response to the host apparatus 3. The response contains requested data (object data) and the like.

More specifically, as shown in the upper illustration of FIG. 15, an area having a size equal to or larger than the size of the data (object data) to be recorded is assured on a disk. This is to absorb the influences of the block skipping replacement process. For example, when $k_1$ ECC block data are recorded on an optical disk, $k_2$ blocks ($k_1 < k_2$) more than $k_1$ blocks actually required for recording the $k_1$ ECC block data are assigned as a recording area of the $k_1$ ECC block data.

The execution condition of the block skipping replacement process will be explained below.

As described above, the header field of one sector field (around 6 mm) contains the header 1 field, header 2 field, header 3 field, and header 4 field. The header 1 field contains the PID1, the header 2 field contains the PID2, the header 3 field contains the PID3, and the header 4 field contains the PID4.

An optical disk drive records data at the target position on an optical disk or plays back data from the target position on the optical disk by the help of four PIDs (PID1 to PID4) contained in the header field in principle. Tracks formed on the optical disk are wobbled. The period of wobbles is, e.g., $\frac{1}{232}$ the sector length. If none of PIDs can be read from the header field due to the influences of scratches, dust, or the like on the optical disk, data can be recorded at the target position on the optical disk or data can be played back from the target position on the optical disk by the help of the wobbles (by counting the wobbles).

However, data recording/playback cannot be continued by the help of only wobbles. That is, the wobbles have a supplementary role when no PIDs can be read. That is, a sector field from which the PID cannot be normally read is preferably handled as a defective sector field.

As described above, one sector field records four PIDs. A PID whose physical sector number cannot be read is called an error PID. When n or more out of the four PIDs contained in one sector field correspond to error PIDS, that sector field is determined to be a defective sector field. A block containing m or more defective sector fields is determined to be a defective block.

When one column of ECC block data generated from data recorded in a given block contains errors of 4 bytes or more, that column containing errors of 4 bytes or more is called an error column. A block that records ECC block data containing eight or more error columns may be determined to be a defective block.

For example, when three or more ones of the four PIDs contained in one sector field correspond to error PIDs, that sector field is determined to be a defective sector field. A block containing one or more defective sector fields is determined to be a defective block. Or a block containing two or more defective sector fields is determined to be a defective block. Or a block containing three or more successive defective sector fields is determined to be a defective block.

The reason why a block containing three or more successive defective sector fields is determined to be a defective block will be explained below. The sector position can be specified using wobbles if the following conditions are satisfied. That is, an optical pickup is located above the target track (no tracking error has occurred), and wobbles suffer less defects. In this case, if many PID error sectors are produced, since a data field is also highly likely to suffer errors, it is not preferable to specify the sector position using only wobbles in terms of data reliability. Hence, in the present invention, in order to prevent such data recording/playback with low reliability, when three or more defective sector fields are successively detected, the corresponding block is skipped, and an area including three or more successive defective sector fields is not used for data recording.

If the discrimination conditions of the defective sector fields are limited to those described above, sometimes the block skipping replacement process is executed frequently and, consequently, the data transfer rate lowers. Hence, defective sector field discrimination is made based on not only the PID read result but also other factors. That is, it is effective to relax the discrimination conditions of defective sector fields to reduce the frequency of occurrence of the block skipping replacement process.

That is, whether or not a given sector field corresponds to a defective sector field can be determined based on the playback result of address data (a discrimination result as to whether or not a given PID corresponds to an error PID), the detection result of wobbles (the count value of wobbles), and the tracking state of a light beam, with which the optical disk is irradiated, with respect to a track.

More specifically, when address data is played back from at least one of the four PIDs stored in the sector field (none of the four PIDS correspond to an error PIDS), and when it is determined that the tracking state is normal, the relative position on the optical disk can be determined based on the wobble detection result. That is, in such case, even when address data is played back from only one of the four PIDS stored in the sector field, that sector field is not determined to be a defective sector field.

If the discrimination conditions of defective blocks are limited to those described above, the block skipping replacement process is executed frequently, resulting in data transfer rate drop. Hence, it is effective to reduce the frequency of occurrence of the block skipping replacement process by relaxing the discrimination conditions of defective blocks as follows.

Even when a given block contains a defective sector field, if data recorded in this defective sector field can be recovered on the basis of the ECC1 and ECC2 contained in this block, it is not determined that this block is a defective one.

The sector skipping replacement process will be explained.

Figure 16:
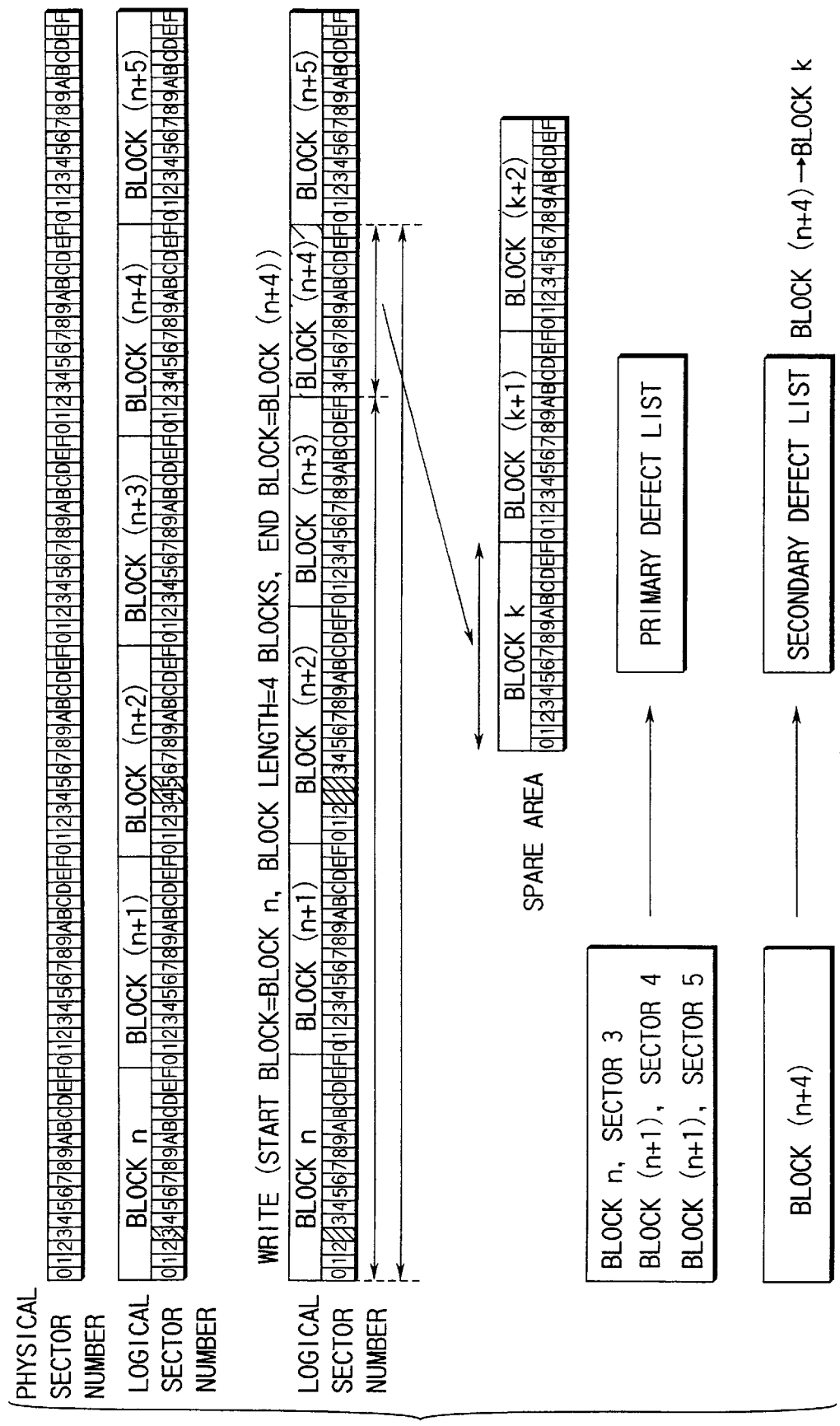
FIG. 16 is a view for explaining a sector skipping replacement process.

Assume that blocks n to (n+5) are provided, as shown in FIG. 16. Each block is constructed by a set of 16 sector fields (physical sector numbers 0 to F; logical sector numbers 0 to F).

Also, assume that a data is to be written in response to, e.g., a write command in such situation. At this time, assume that the write command indicates a start block=block n, a block length=4 blocks, and an end block=block (n+4).

Furthermore, assume that a sector with physical sector number 3 (=logical sector number 3) in block n is a defective sector. Likewise, assume that sectors with physical sector number 4 (=logical sector number 4) and physical sector number 5 (=logical sector number 5) in block (n+2) are defective sectors.

In such case, these defective sectors are to be replaced by a skipping replacement process. That is, a PDL registers physical sector number 3 of block n and physical sector numbers 4 and 5 of block (n+2). At this time, no logical address numbers are assigned to physical sector number 3 of block n and physical sector numbers 4 and 5 of block (n+2). In other words, logical address numbers are serially assigned while skipping physical sector number 3 of block n and physical sector numbers 4 and 5 of block (n+2). At this time, blocks are reconfigured, as shown in FIG. 16. Block (n+4) affected by the skipping replacement process is to be replaced by a linear replacement process. That is, an SDL registers physical sector number 0 of block (n+4) as that of the first sector in a defective block, and also registers physical sector number 0 of block K as that of the first sector in a replacement block.

The sector skipping replacement process will be explained in more detail below with reference to FIG. 17.

Figure 17:
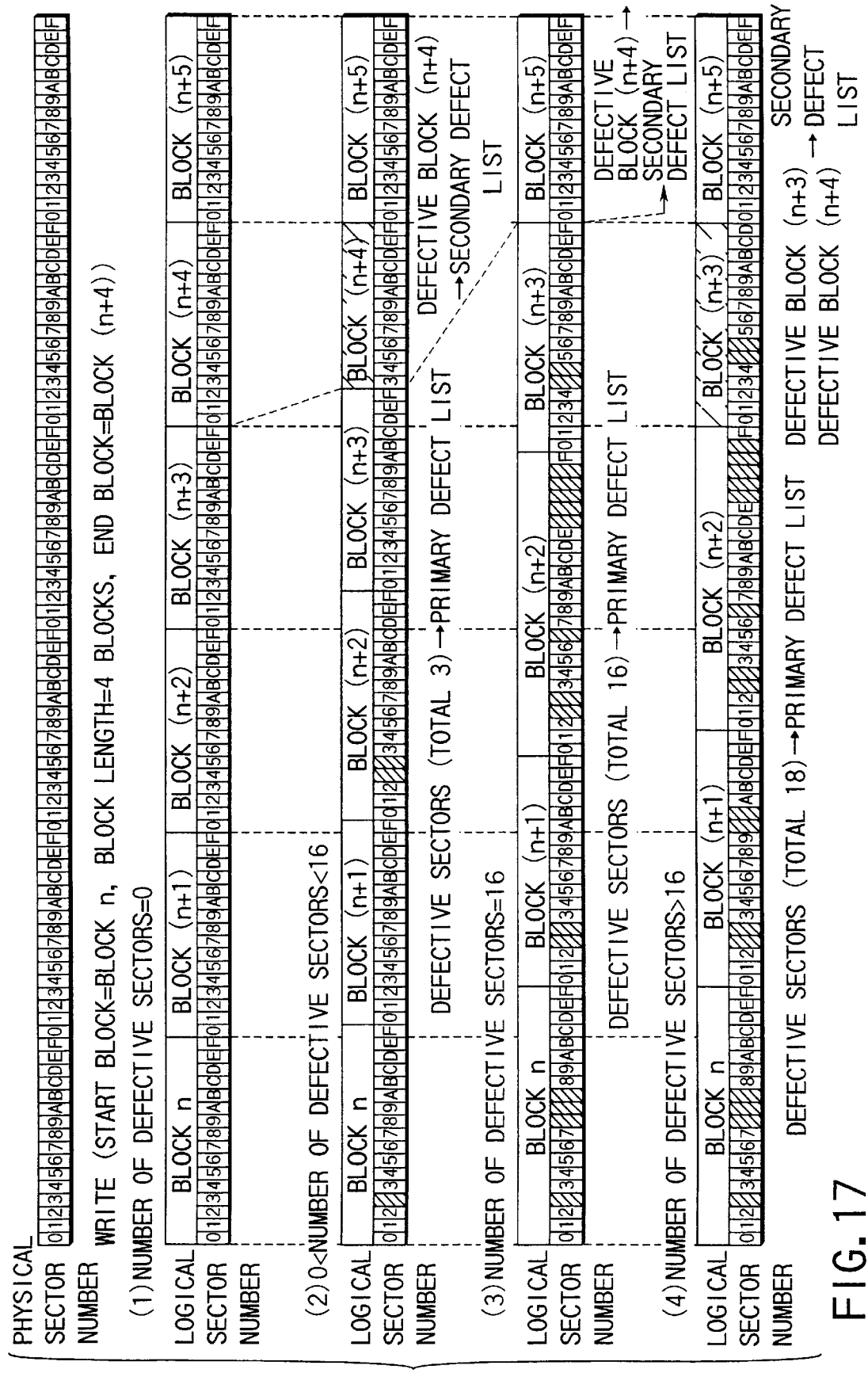
FIG. 17 is a view for explaining a sector skipping replacement process as in FIG. 16.

Assume that blocks n to (n+5) are provided, as shown in FIG. 17. Each block is constructed by a set of 16 sector fields (physical sector numbers 0 to F; logical sector numbers 0 to F).

Also, assume that a data is to be written in response to, e.g., a write command in such situation. At this time, assume that the write command indicates a start block=block n, a block length=4 blocks, and an end block=block (n+4).

(1) When the number of defective sectors is zero, blocks n to (n+4) remain the same, and the logical sector numbers of sectors that construct each of these blocks remain the same.

(2) When the number of defective sectors is larger than 0 and smaller than 16, block (n+4) affected by the defective sectors is to be replaced by the linear replacement process. A PDL registers the physical address numbers of the defective sectors, and an SDL records an address indicating that block (n+4) is replaced by a predetermined replacement block. (2) of FIG. 17 exemplifies a case wherein the number of defective sectors is 3.

(3) When the number of defective sectors is 16, block (n+4) affected by the defective sectors is to be replaced by the linear replacement process. A PDL registers the physical address numbers of the defective sectors, and an SDL records an address indicating that block (n+4) is replaced by a predetermined replacement block.

(4) When the number of defective sectors is larger than 16 and smaller than 32, blocks (n+3) and (n+4) affected by the defective sectors are to be replaced by the linear replacement process. A PDL registers the physical address numbers of the defective sectors, and an SDL records an address indicating that block (n+3) is replaced by a predetermined replacement block, and an address indicating that block (n+4) is replaced by a predetermined replacement block. (4) of FIG. 17 exemplifies a case wherein the number of defective sectors is 18.

The advantage of the block skipping replacement process and sector skipping replacement process is that they can shorten the moving distance of an optical head compared to the linear replacement process. The linear replacement process is not suitable for real-time recording since it tends to prolong the moving distance of the optical head relative to the skipping processes. However, using the block skipping replacement process and sector skipping replacement process, the moving distance of the optical head can be minimized, and real-time recording can be realized.

User data write processes corresponding to the slipping replacement process, linear replacement process, block skipping replacement process, and sector skipping replacement process will be explained below.

User data is written in the user data based on the PDL and SDL. That is, when user data is written in a given sector field, if this sector field is registered in the PDL as an entry, user data is written in a normal sector field next to this sector field by slipping the sector field (defective field). On the other hand, when a write block of user data is a defective block registered in the SDL, the user data is written in a replacement block corresponding to that defective block.

Figure 18:
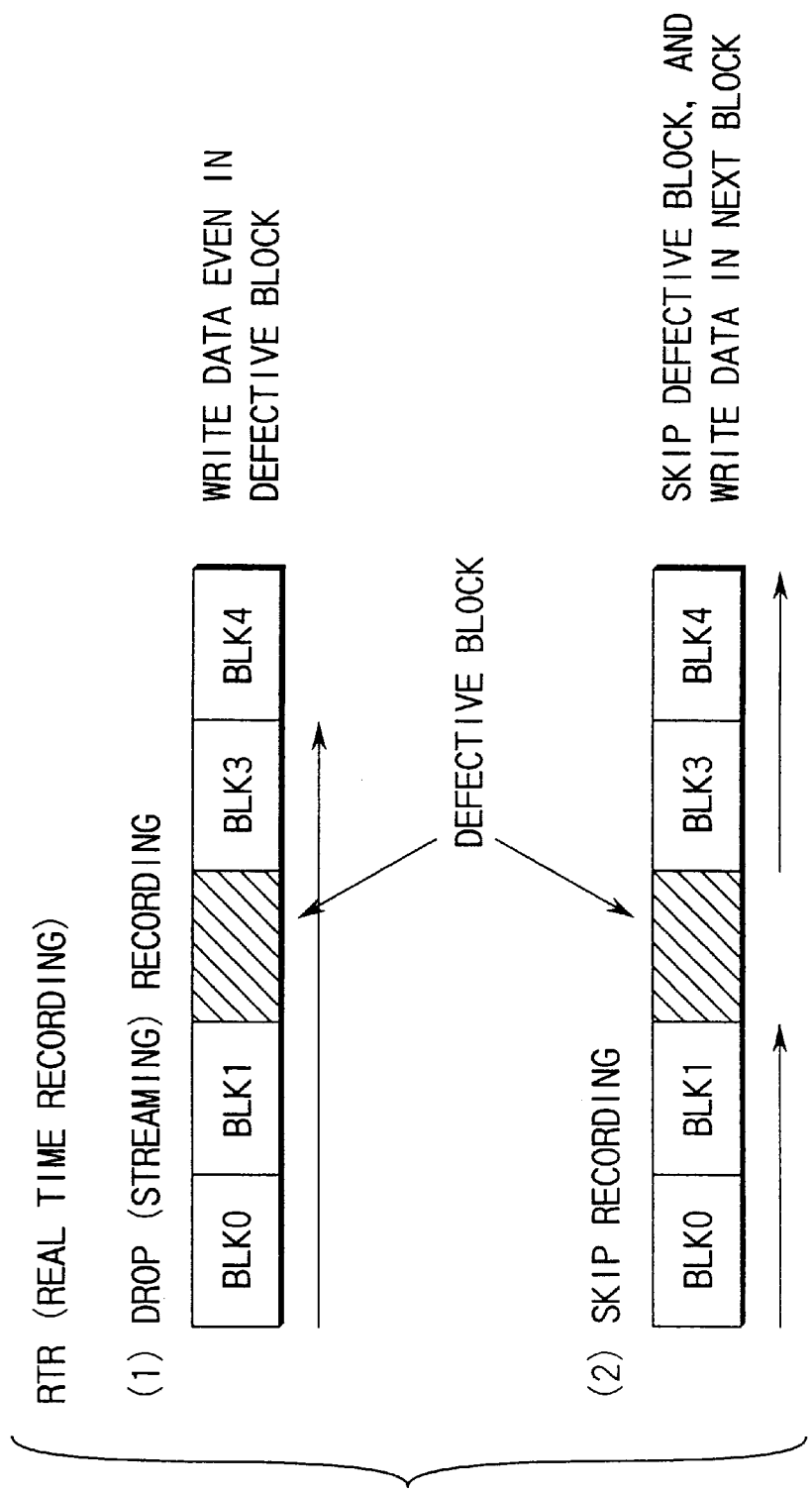
FIG. 18 is a view for explaining drop recording and skip recording in RTR (Real Time Recording)

Drop recording and skip recording in RTR (Real Time Recording) will be explained below with the aid of FIG. 18. In drop recording, data is written even on a defective block (without skipping the defective block). In skip recording, the aforementioned block skipping replacement process is used. That is, in skip recording, data is written on the next block (normal block) while skipping a defective block.

The format of an optical disk will be described below.

In a FAT (file allocation table) prevalently used in file systems of information storage media (hard disks, magnetooptical disks, and the like) for personal computers, information is recorded on an information recording medium to have 256 or 512 bytes as a minimum unit.

By contrast, in information storage media such as a DVD-video, DVD-ROM, DVD-R, DVD-RAM, and the like, a UDF (universal disk format) specified by OSTA and ISO13346 are used as a file system. In this case, information is recorded on an information recording medium to have 2,048 bytes as a minimum unit. The file management method is basically premised on a hierarchical file system which manages files in a tree pattern to have a root directory as a parent directory.

As shown in FIG. 13, the optical disk 1 is formatted by the optical disk drive 2 connected to the host apparatus 3. The host apparatus 3 issues various kinds of instructions to the optical disk drive 2. The optical disk drive 2 executes various kinds of operations in accordance with instructions sent from the host apparatus 3.

For example, as shown in FIG. 13, when the host apparatus 3 sends a format execution instruction to the optical disk drive 2, the optical disk drive 2 formats the optical disk 1 in accordance with this instruction. That is, the optical disk 1 undergoes predetermined formatting according to the instruction from the host apparatus 3. Upon formatting, for example, a PDL, SDL, and SAL are created in a DMA assured in the lead-in area A1 of the optical disk 1. That is, the host apparatus 3 sends data for creating a PDL, SDL, and SAL to the optical disk drive 2. The optical disk drive 2 stores data for creating these lists, and creates the respective lists on the DMA on the optical disk 1 in accordance with the stored data.

The optical disk drive 2 records the addresses (the start address indicating the start position of each spare area and the end address indicating the end position of the spare area) of each spare area in the SAL in accordance with an instruction sent from the host apparatus 3. The spare area addresses are recorded in the SAL at least one of the format timing, certify timing (upon certifying primary defectives), and verify timing (upon recording user data). That is, the spare area addresses may be recorded in the SAL only at the format, certify, or verify timing, or at the format and verify timings, certify and verify timings, or format, certify, and verify timings. In other words, the spare areas are assured in accordance with an instruction from the host apparatus 3 at these timings. In addition to these timings, spare areas are assured at a timing at which the optical disk drive 3 determines that the number of spare areas is insufficient.

In this manner, since spare areas can be assured not only at the format timing but also at the certify and verify timings, even when the size of spare areas assured at the format timing becomes insufficient as a result of a slipping replacement process and linear replacement process, new spare areas can be added. The host apparatus 3 is informed of an insufficient spare area size by the optical disk drive 2, and issues a spare area addition instruction to the disk drive 2. Upon receiving this instruction, the optical disk drive 2 adds spare areas to the optical disk 1 in accordance with this instruction.

As described above, since the information recording medium (optical disk) has the SAL, spare areas with an arbitrary size can be assured at arbitrary positions. As a result, the capacity of the information recording medium can be fully and effectively utilized.

Note that certification and verification of the optical disk are not always done but may be omitted in some cases. Also, in order to synchronize between the aforementioned hierarchical file system (SAL created in accordance with an instruction from the host apparatus 3) and an SAL managed in the optical disk drive, for example, defragmentation (reallocation) is inhibited.

Not that spare areas may be registered in either a logical space accessed by the host apparatus or other spaces. That is, spare areas may be expanded in the user area, or in areas other than the user area. The spare area positions are managed using the physical addresses on the disk. The synchronization scheme with the host apparatus varies depending on whether spare areas are allocated in or outside the user area. When spare areas are allocated in the user area, it is important to inhibit the host apparatus from accessing the spare areas, and synchronization is required. When spare areas are allocated outside the user area, and the host apparatus recognizes a new user area, it need not store the locations of the spare areas.

Assurance of spare areas will be explained below.

Figure 10:
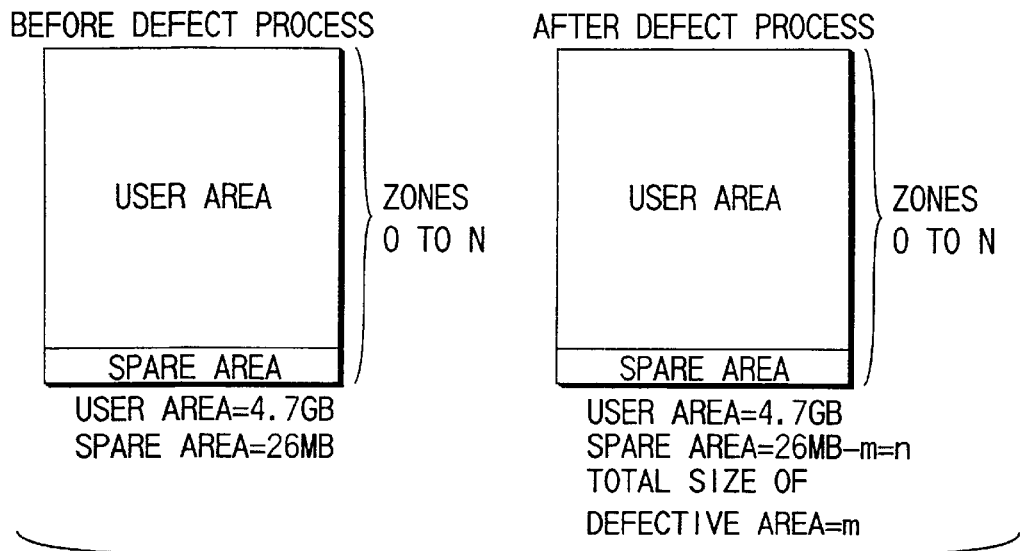
FIG. 10 is a view showing changes in size of a user area and spare area before and after a defect process.

As shown in FIG. 10, a user area=4.7 GB and spare area=26 MB before a certification process. After the certification process, a user area=4.7 GB and spare area=26 MB−m (total size of defective areas)=n. That is, a user area of 4.7 GB is assured before and after the certification process.

Figure 11:
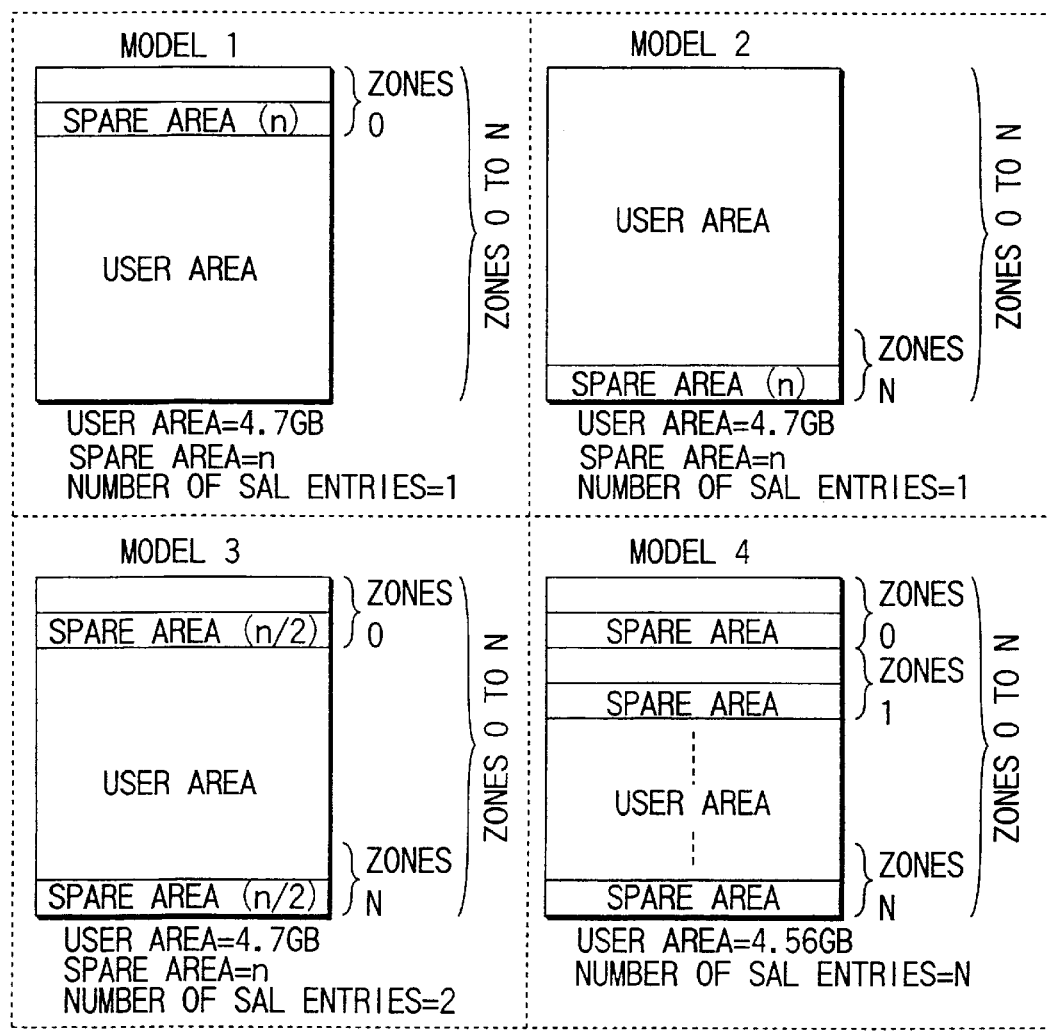
FIG. 11 is a view showing some layouts of a spare area.

As spare area assurance patterns, for example, four models shown in FIG. 11 may be used. Of course, various other patterns are available in addition to these models. These four patterns can be implemented by storing predetermined addresses (the physical address number of the first sector of spare area n, and the physical address number of the last sector of spare area n) in the SAL.

In model 1 shown in FIG. 11, a spare area (size n) is assured in only zone 0. In case of model 1, the user area size is 4.7 GB, the spare area size is n, and the number of entries of spare areas is 1.

In model 2 shown in FIG. 11, a spare area (size n) is assured in only zone N. In case of model 2, the user area size is 4.7 GB, the spare area size is n, and the number of entries of spare areas is 1.

In model 3 shown in FIG. 11, spare areas (size n/2) are assured in zones 0 and N. In case of model 3, the user area size is 4.7 GB, the spare area size is n (2×n/2), and the number of entries of spare areas is 2.

In model 4 shown in FIG. 11, spare areas are assured in zones 0, 1, 2, . . . , N. In case of model 4, the user area size is 4.56 GB, and the number of entries of spare areas is N.

Models 1 to 4 mentioned above may be implemented as recommended models of spare areas. That is, upon recording the addresses of a spare area in the SAL, addresses (recommended addresses) that implement one of models 1 to 4 may be automatically recorded by the optical disk drive 2.

Or addresses (recommended addresses) that implement one of models 1 to 4 may be provided as default values. When the optical disk drive 2 designates one of models 1 to 4, spare areas shown in models 1 to 4 can be easily assured. The recording location of the addresses (recommended addresses) that implement one of models 1 to 4 is the lead-in area (DMA or the like) and lead-out area.

In a conventional information recording medium (DVD-RAM), the spare area positions and size are determined in advance by the standard format. For this reason, spare areas often become too large or too small.

By contrast, since an information recording medium (DVD-RAM) according to the present invention has an SAL, spare areas with an arbitrary size can be assured at arbitrary positions. That is, spare areas can be freely expanded or contracted, and spare areas can be assured in correspondence with an application of the information recording medium. In this manner, the capacity of the information storage medium can be effectively utilized.

An outline of a data recording apparatus that executes a data recording process including replacement processes (slipping replacement process, linear replacement process, and skipping replacement process) will be explained below with reference to FIG. 19.

Figure 19:
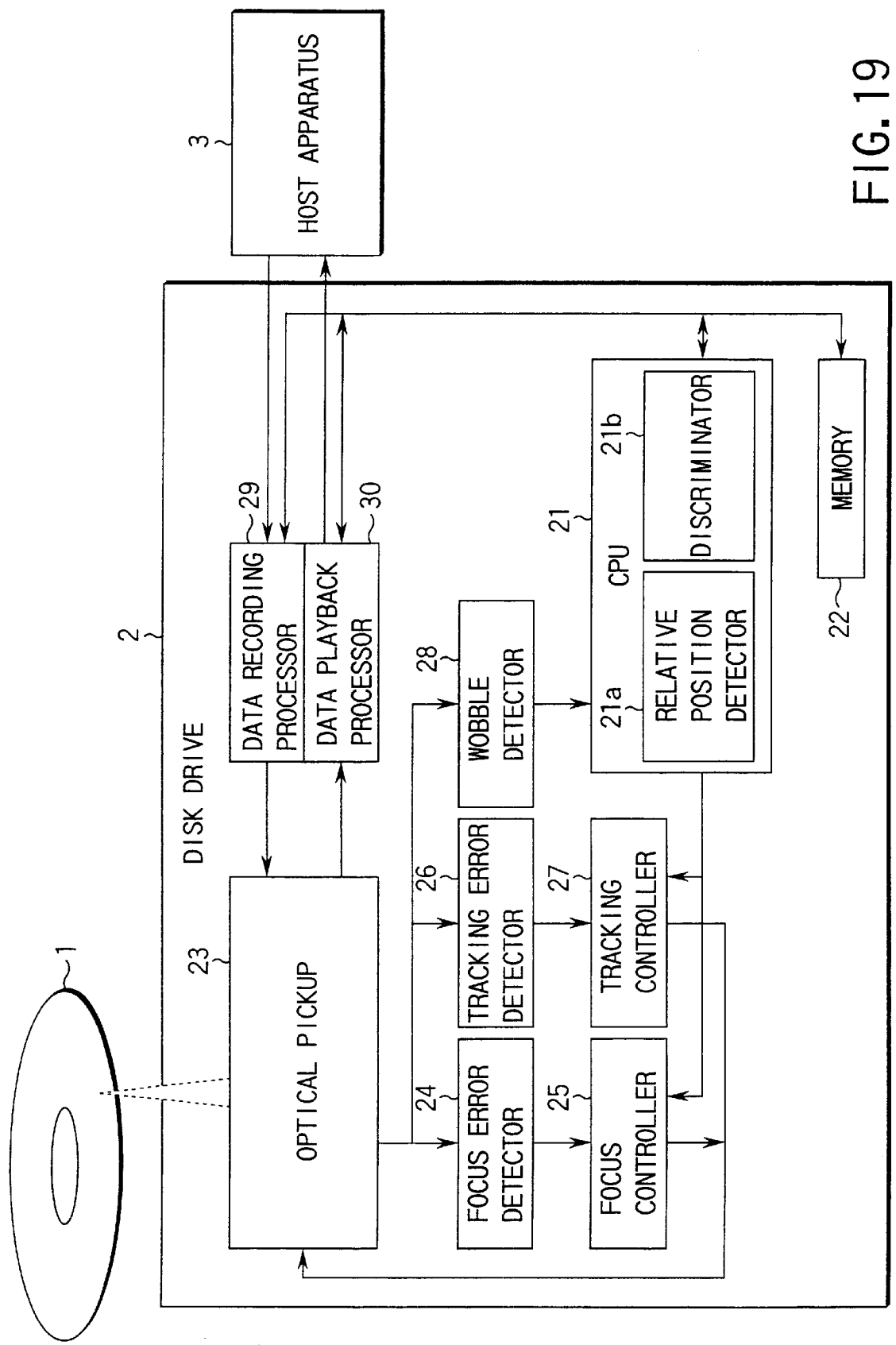
FIG. 19 is a schematic block diagram showing the arrangement of a data recording apparatus.

As shown in FIG. 19, the data recording apparatus records data on the optical disk 1. This optical disk 1 has a plurality of zones, as shown in FIG. 1. A plurality of sector fields shown in FIG. 2 are successively assured on each of these zones. These successive sector fields form a track wobbled at predetermined periods. Each of these sector fields has a recording field and four header fields, as shown in FIG. 2. The header fields assured in one sector field record identical address data.

One block includes 16 sector fields. When ECC block data shown in FIG. 3 is recorded on this block, 16 sector data shown in FIG. 4, which are generated based on the ECC block data, are recorded in 16 recording fields included in the block to have one-to-one correspondence with each other. As shown in FIG. 3, the ECC block data contains block data DB, ECC1, and ECC2. The block data contains predetermined data added along the first direction (row direction) and the second direction (column direction) perpendicular to the first direction. The ECC1 corrects predetermined data along the first direction. The ECC2 corrects predetermined data along the second direction. The sector data includes a segment of 16-segmented block data DB, a segment of the ECC1 corresponding to the segment of the block data DB, and a segment of the 16-segmented ECC2.

The data recording apparatus for recording data on the optical disk 1 mentioned above comprises the optical disk drive 2 and host apparatus 3. The disk drive 2 comprises a CPU 21, memory 22, optical pickup 23, focus error detector 24, focus controller 25, tracking error detector 26, tracking controller 27, wobble detector 28, data recording processor 29, data playback processor 30, and the like.

The CPU 21 controls the respective units of the disk drive 2. The memory 22 stores predetermined data. The optical pickup 23 irradiates the optical disk with a playback light beam, and detects light reflected by the optical disk. The data playback processor 30 plays back data recorded on the optical disk on the basis of the detection result of reflected light detected by the optical pickup 23. On the other hand, the data recording processor 29 generates ECC block data on the basis of recording data provided from the host apparatus 3, and also generates sector data from the ECC block data. The optical pickup 23 irradiates the optical disk with a recording light beam which reflects the generated sector data, thus recording data on the optical disk.

The focus error detector 24 detects focus errors of the light beam emitted by the optical pickup 23 on the basis of the detection result of reflected light detected by the optical pickup 23. The focus controller 25 controls focusing of the light beam emitted by the optical pickup 23 on the basis of the focus error detection result detected by the focus error detector 24.

The tracking error detector 26 detects tracking errors of the light beam emitted by the optical pickup 23 on the basis of the detection result of reflected light detected by the optical pickup 23. The tracking controller 27 controls tracking of the light beam emitted by the optical pickup 23 on the basis of the tracking error detection result detected by the tracking error detector 26.

The wobble detector 28 detects wobbles of tracks on the optical disk, and supplies the wobble detection result to a relative position detector 21a in the CPU 21. The relative position detector 21a counts the number of wobbles on the basis of the wobble detection result, and detects the relative position on the optical disk.

A discriminator 21b in the CPU 21 discriminates defective sectors and blocks on the basis of data played back by the data playback processor 30. Based on the discrimination result of the discriminator 21b, the CPU 21 controls the respective units to execute the replacement processes (slipping replacement process, linear replacement process, and skipping replacement process).

Figure 20:
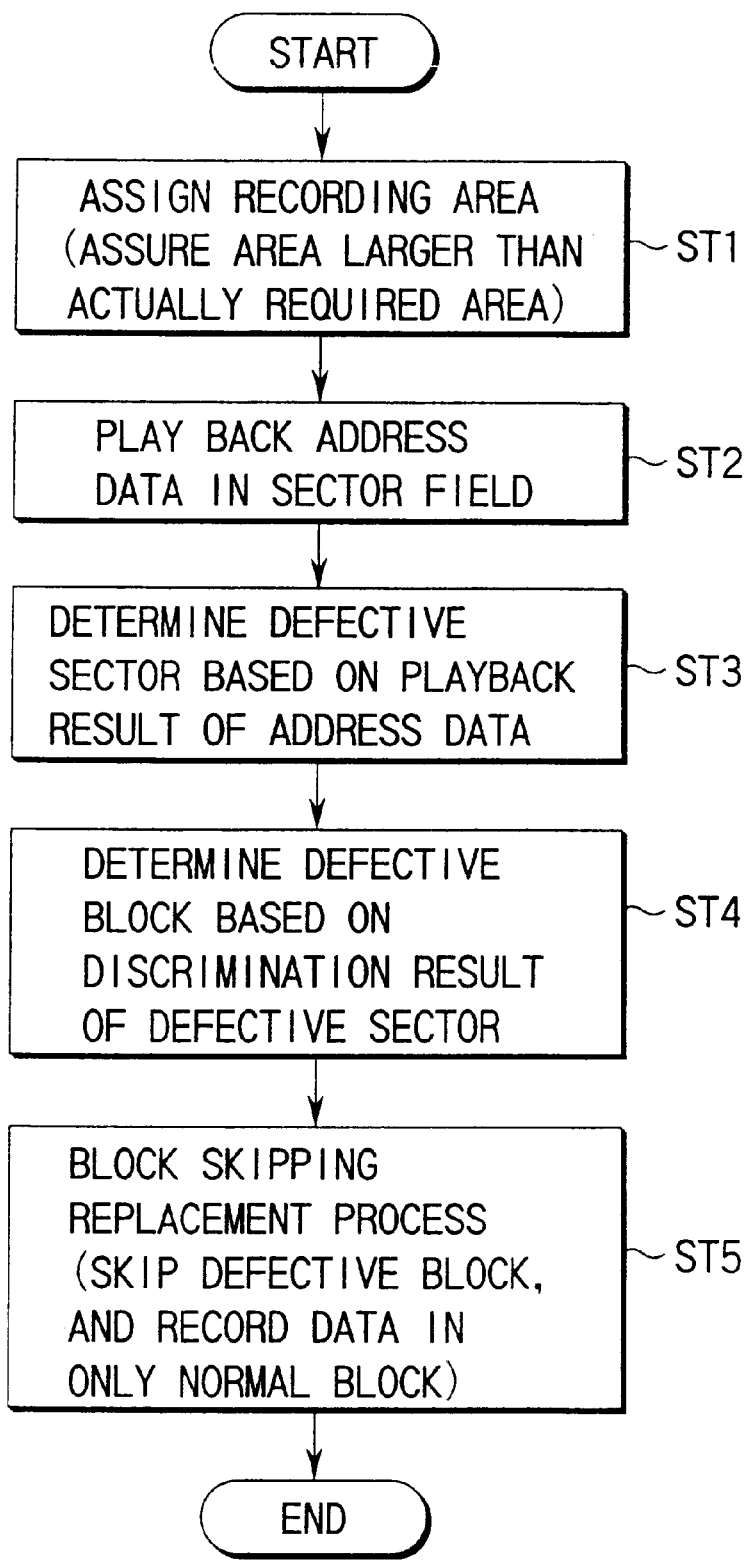
FIG. 20 is a flow chart showing data recording processes including a replacement process (block skipping replacement process).

The block skipping replacement by the data recording apparatus mentioned above will be summarized below with reference to the flow chart shown in FIG. 20.

The host apparatus 3 instructs the disk drive 2 to assign a relatively larger data recording area (ST1). For example, when $k_1$ ECC block data are recorded on an optical disk, the host apparatus 3 instructs to assign $k_2$ blocks ($k_1 < k_2$) more than $k_1$ blocks actually required for recording the $k_1$ ECC block data as a recording area of the $k_1$ ECC block data.

The optical pickup 23 and data playback processor 30 play back address data recorded in each header field of each sector field (ST2). The discriminator 21a discriminates based on the playback result of the address data if the sector field that records the playback address data is defective (ST3). Defective sector discrimination in step ST3 has already been described in detail above. Furthermore, the discriminator 21a discriminates based on the defective sector discrimination result if a block is defective (discrimination of a defective block) (ST4). Defective block discrimination in step ST4 has already been described in detail above.

Upon recording a predetermined number of sector data in a predetermined number of sector fields included in each block to have one-to-one correspondence with each other, the optical pickup 23, data recording processor 29, and CPU 21 skip a discriminated defective block, and replace and record the predetermined number of sector data in a predetermined number of sector fields included in a normal block which is not discriminated as a defective one (ST5).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data recording method including a replacement process, comprising:

recording ECC block data in a block next to a defective block of an optical disk, without the ECC block data being recorded in the defective block, the optical disk having a plurality of zones, a plurality of sector fields being successively assured on each of the plurality of zones, the successive sector fields forming a track wobbled at a predetermined period, each sector field having a recording field and a plurality of header fields, identical address data being recorded on the header fields assured in a single sector field, one block including a predetermined number of sector fields, a predetermined number of sector data generated based on the ECC block data being recorded in a predetermined number of recording fields included in a block to have one-to-one correspondence with each other upon recording the ECC block data in the block, the ECC block data including block data, a first error correction code, and a second error correction code, the block data including predetermined data added along a first direction and a second direction perpendicular to the first direction, the first error correction code correcting the predetermined data along the first direction, the second error correction code correcting the predetermined data along the second direction, and the sector data including a segment of the block data segmented into a predetermined number of segments, a segment of the first error correction code corresponding to the segment of the block data, and a segment of the second error correction code segmented into a predetermined number of segments.

2. A method according to claim 1, wherein said defective block is a block listed in a defect list.

3. A data recording apparatus including a replacement process, comprising:

a recording section configured to record data in an optical disk; and a recording control section configured to record ECC block data in a block next to a defective block, without the ECC block data being recorded in the defective block, the optical disk having a plurality of zones, a plurality of sector fields being successively assured on each of the plurality of zones, the successive sector fields forming a track wobbled at a predetermined period, each sector field having a recording field and a plurality of header fields, identical address data being recorded on the header fields assured in a single sector field, one block including a predetermined number of sector fields, a predetermined number of sector data generated based on the ECC block data being recorded in a predetermined number of recording fields included in a block to have one-to-one correspondence with each other upon recording the ECC block data in the block, the ECC block data including block data, a first error correction code, and a second error correction code, the block data including predetermined data added along a first direction and a second direction perpendicular to the first direction, the first error correction code correcting the predetermined data along the first direction, the second error correction code correcting the predetermined data along the second direction, and the sector data including a segment of the block data segmented into a predetermined number of segments, a segment of the first error correction code corresponding to the segment of the block data, and a segment of the second error correction code segmented into a predetermined number of segments.

4. A data recording apparatus according to claim 3, wherein said defective block is a block listed in a defect list.

5. A data recording method including a replacement process, comprising:

securing a storage capacity on an optical disk when predetermined data is recorded in the optical disk, the storage capacity being secured by use of a write command including a start logical sector number, the number of blocks, and an end logical sector number, and being set at a value more than a capacity of the predetermined data so as to absorb an effect the replacement process may have, selecting a defective block from among blocks each of which has a predetermined number of sector fields, and determining that block-skipping replacement processing should be executed with respect to the defective block; and issuing a response, which includes a last logical sector number, to the write command, the optical disk including a data area having a plurality of zones, a plurality of sector fields being provided on each of the plurality of zones, each of the sector fields including a header field and a recording field, four header data respectively including four addresses being written in the header field, the sector fields including a predetermined number of sector fields whose recording fields are used for storing a predetermined number of sector data generated based on ECC block data, the ECC block data including block data, a horizontal error correction code, and a vertical error correction code, the block data including data arranged in a matrix pattern of a predetermined number of rows and a predetermined number of columns, and being divided into a predetermined number of data units, the horizontal error correction code correcting an error in a column of data included in the block data, the vertical error correction code correcting an error in a row of data included in the block data, and the sector data including a data unit, a segment of the horizontal error correction code assigned to the data unit, and a segment of the vertical error correction code assigned to the data unit.

6. A data recording method according to claim 5, wherein if not less than three successive defective sector fields are found, a block including the successive defective sector fields is regarded as a defective block.

7. A data recording method according to claim 6, wherein a sector field is regarded as a defective sector field if not less than three addresses cannot be reproduced from the four addresses written in the header field.

8. A data recording apparatus including a replacement process, comprising:

a capacity securing section configured to secure a storage capacity on an optical disk when predetermined data is recorded in the optical disk, the storage capacity being secured by use of a write command including a start logical sector number, the number of blocks, and an end logical sector number, and being set at a value more than a capacity of the predetermined data so as to absorb an effect the replacement process may have, a replacement processing section configured to select a defective block from among blocks each of which has a predetermined number of sector fields, and determine that block-skipping replacement processing should be executed with respect to the defective block; and a response section configured to issue a response to the write command, the response including data on the total number of data-recorded blocks and a last logical sector number, the optical disk including a data area having a plurality of zones, a plurality of sector fields being provided on each of the plurality of zones, each of the sector fields including a header field and a recording field, four header data respectively including four addresses being written in the header field, the sector fields including a predetermined number of sector fields whose recording fields are used for storing a predetermined number of sector data generated based on ECC block data, the ECC block data including block data, a horizontal error correction code, and a vertical error correction code, the block data including data arranged in a matrix pattern of a predetermined number of rows and a predetermined number of columns, and being divided into a predetermined number of data units, the horizontal error correction code correcting an error in a column of data included in the block data, the vertical error correction code correcting an error in a row of data included in the block data, and the sector data including a data unit, a segment of the horizontal error correction code assigned to the data unit, and a segment of the vertical error correction code assigned to the data unit.

9. A data recording apparatus according to claim 8, further comprising a defective block-determination section configured to determine that, if not less than three successive defective sector fields are found, a block including the successive defective sector fields is a defective block.

10. A data recording apparatus according to claim 9, further comprising a defective sector-determination section configured to determine that a sector field is a defective sector field if not less than three addresses cannot be reproduced from the four address written in the header field.

* * * * *